United States Patent
Line et al.

(10) Patent No.: US 11,214,179 B2
(45) Date of Patent: *Jan. 4, 2022

(54) PIVOTING SEAT ASSEMBLY

(71) Applicant: Ford Global Technologies, LLC, Dearborn, MI (US)

(72) Inventors: Johnathan Andrew Line, Northville, MI (US); Marcos Silva Kondrad, Macomb Township, MI (US); Joseph Michael Kish, Canton, MI (US); Macit Aktas, Windsor (CA); Spencer Robert Hoernke, Dundas (CA); David Frederick Lyons, New Haven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 246 days.

This patent is subject to a terminal disclaimer.

(21) Appl. No.: 16/452,639

(22) Filed: Jun. 26, 2019

(65) Prior Publication Data
US 2020/0406788 A1    Dec. 31, 2020

(51) Int. Cl.
*B60N 2/14* (2006.01)
*B60N 2/06* (2006.01)
*B60N 2/30* (2006.01)
*B60N 2/16* (2006.01)

(52) U.S. Cl.
CPC .............. *B60N 2/143* (2013.01); *B60N 2/06* (2013.01); *B60N 2/162* (2013.01); *B60N 2/3047* (2013.01)

(58) Field of Classification Search
CPC ...... B60N 2/143; B60N 2/3011; B60N 2/067; B60N 2/01; B60N 2/162; B60N 2/3045; B60N 2/0732; B60N 2/073; B60N 2002/024; B60N 2/508; B60N 2/164; B60N 2/1842; B60N 2/1817; B60N 2/1695

See application file for complete search history.

(56) References Cited

U.S. PATENT DOCUMENTS

| | | | | |
|---|---|---|---|---|
| 2,290,464 A | * | 7/1942 | Buchheit ................ | B60N 2/14 296/65.07 |
| 3,338,622 A | * | 8/1967 | Bachmann ............. | B60N 2/143 296/65.07 |
| 5,000,505 A | * | 3/1991 | Kawashita ............. | B60N 2/143 296/64 |
| 5,320,411 A | * | 6/1994 | Sera ...................... | A47C 11/005 297/331 |
| 5,636,884 A | * | 6/1997 | Ladetto .................. | B60N 2/06 296/65.09 |
| 5,639,141 A | * | 6/1997 | Hanemaayer .......... | B60N 2/062 296/156 |
| 5,951,106 A | * | 9/1999 | Hirama .................. | B60N 2/146 297/344.22 |

(Continued)

*Primary Examiner* — David R Dunn
*Assistant Examiner* — Christopher E Veraa
(74) *Attorney, Agent, or Firm* — David Coppiellie; Price Heneveld LLP

(57) ABSTRACT

A seat assembly includes a base frame supporting a lift mechanism. A seatback is operably coupled to a seat portion. The seatback and the seat portion are vertically adjustable as powered by the lift mechanism. The seat portion is pivotally coupled to the seatback by a support bracket for rotational movement between first and second positions. A seat frame of the seat portion is vertically juxtaposed over the lift mechanism when the seat portion is in the second position.

14 Claims, 18 Drawing Sheets

(56) References Cited

U.S. PATENT DOCUMENTS

| | | | |
|---|---|---|---|
| 6,142,552 A | 11/2000 | Husted et al. | |
| 6,457,765 B1* | 10/2002 | Bergquist | B60N 2/01 296/64 |
| 6,666,514 B2* | 12/2003 | Muraishi | B60N 2/146 248/349.1 |
| 7,108,325 B2* | 9/2006 | Williamson | A47C 3/18 297/344.22 |
| 7,357,451 B2 | 4/2008 | Bendure et al. | |
| 7,559,594 B2* | 7/2009 | McMillen | B60N 2/206 296/65.09 |
| 7,950,740 B2 | 5/2011 | Bunea et al. | |
| 8,585,146 B1* | 11/2013 | Giasson | B64D 11/0644 297/344.1 |
| 9,045,061 B2* | 6/2015 | Kostin | B60N 2/1615 |
| 9,919,626 B2* | 3/2018 | Goodhall | B60N 2/3031 |
| 10,065,536 B2* | 9/2018 | Poniatowski | B60N 2/2245 |
| 10,464,451 B2* | 11/2019 | Stamper | B60N 2/2869 |
| 10,857,913 B2* | 12/2020 | Dry | B60N 2/062 |
| 2006/0226685 A1* | 10/2006 | Priepke | B60N 2/143 297/344.24 |
| 2009/0195037 A1* | 8/2009 | Plavetich | B60N 2/062 297/257 |
| 2010/0253123 A1* | 10/2010 | DeCraene | B60N 2/062 297/344.22 |
| 2014/0077554 A1* | 3/2014 | Fujioka | B60N 2/682 297/313 |
| 2014/0238188 A1* | 8/2014 | Ito | B60N 2/0232 74/664 |
| 2015/0375638 A1* | 12/2015 | Farooq | B60N 2/0715 297/344.12 |
| 2016/0114703 A1* | 4/2016 | Fujita | B60N 2/0825 297/344.1 |
| 2020/0086768 A1* | 3/2020 | Line | B60N 2/0806 |
| 2020/0086769 A1* | 3/2020 | Aktas | B60N 2/146 |

* cited by examiner

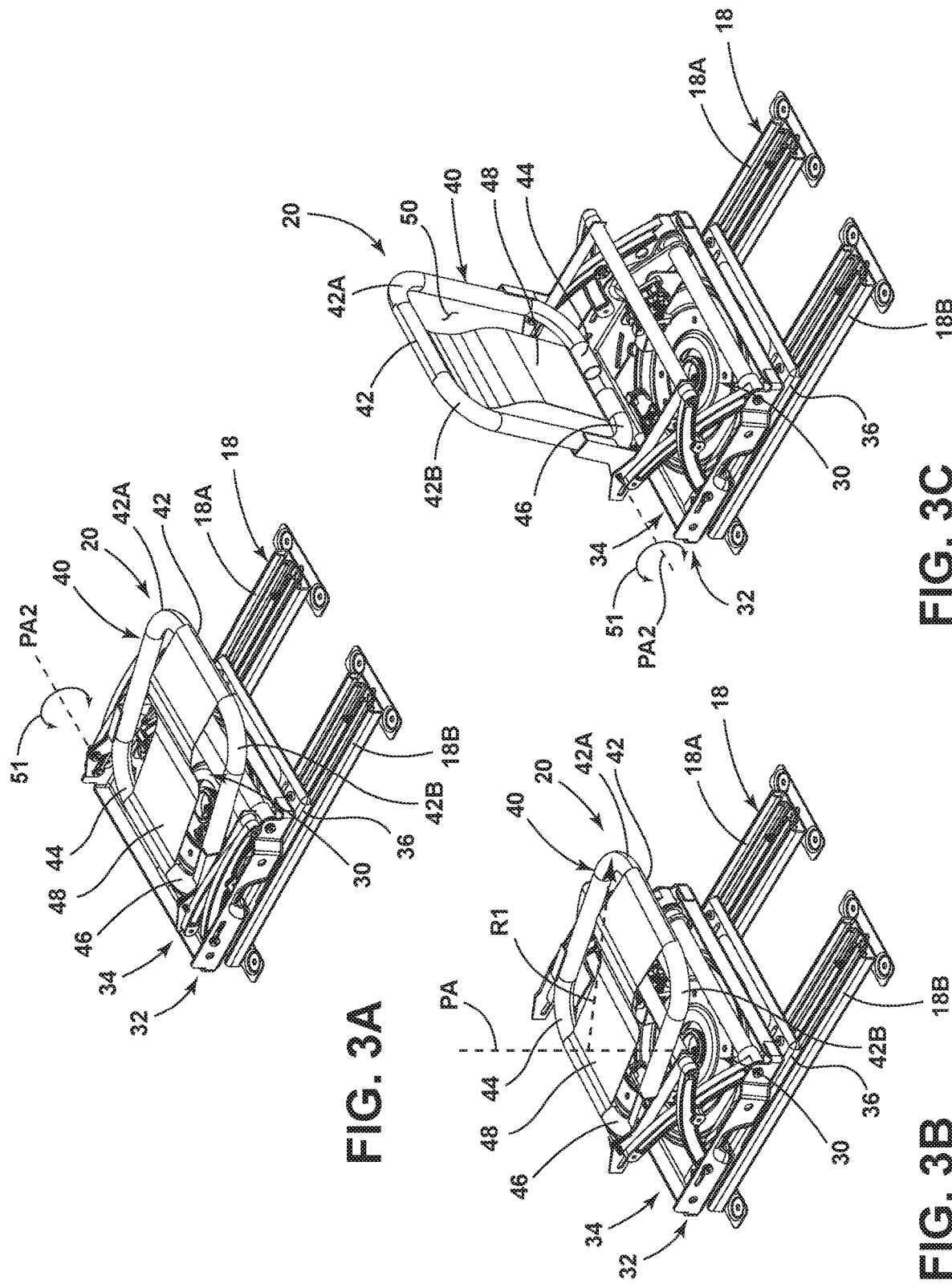

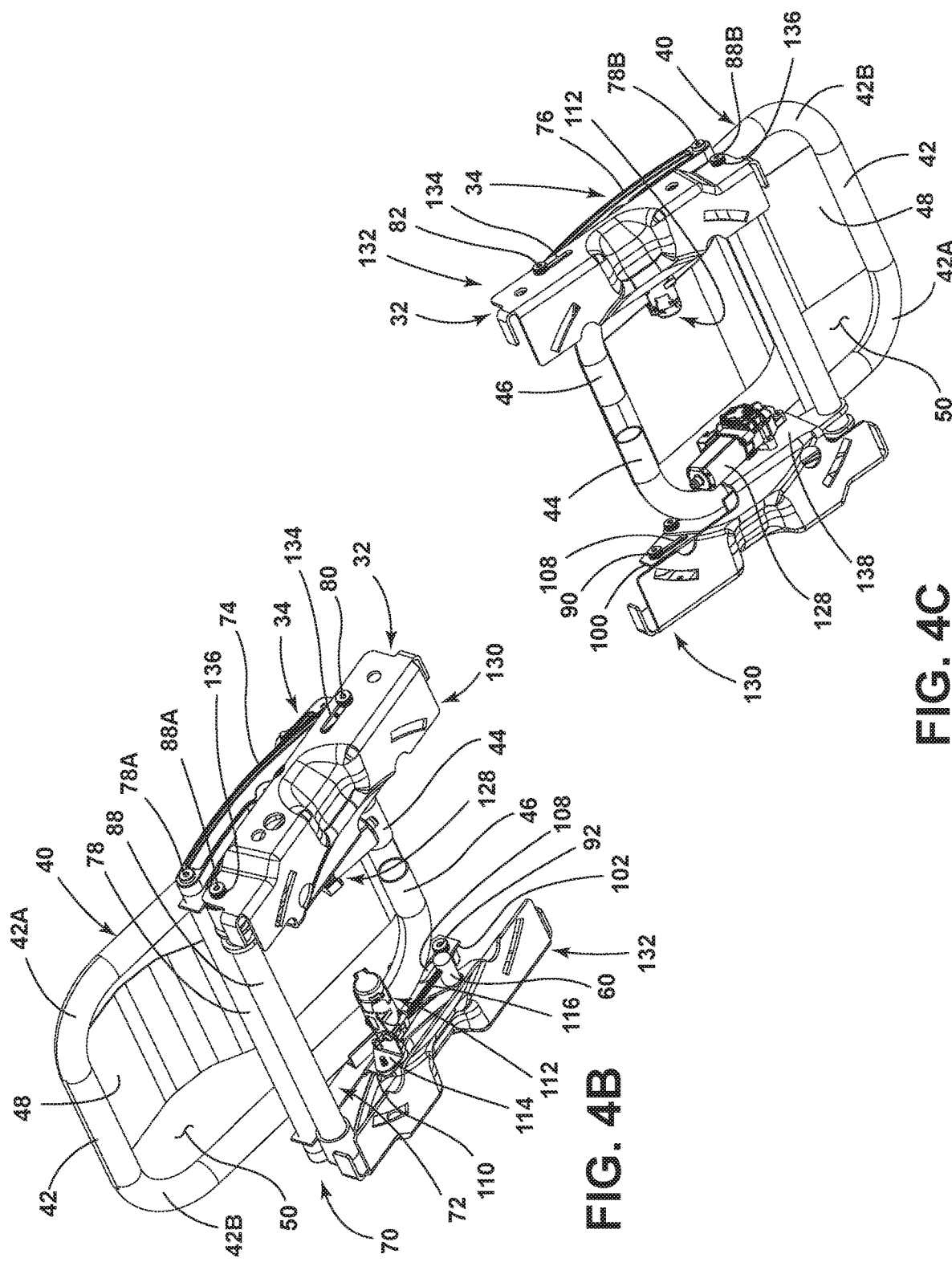

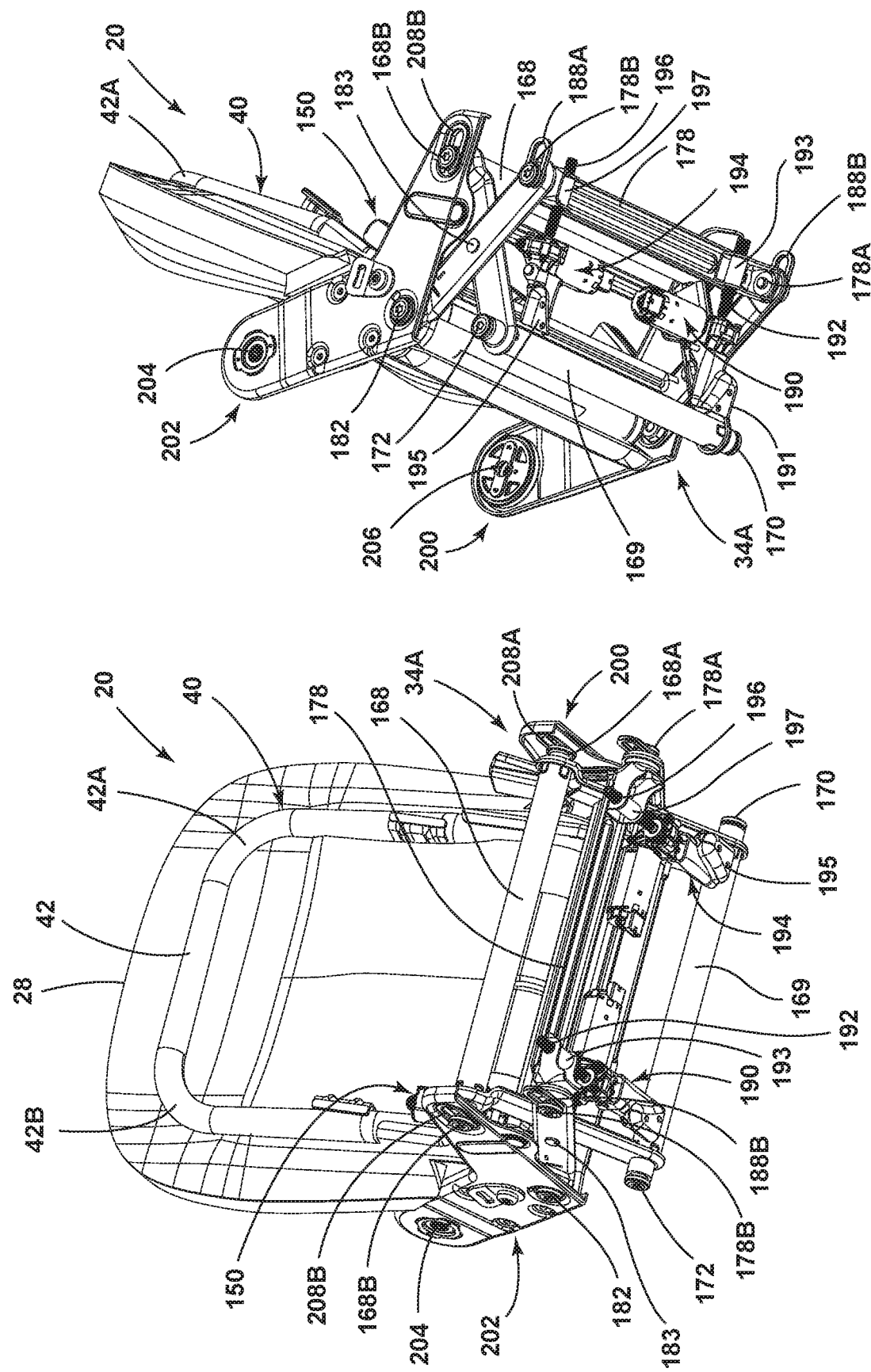

PIVOTING SEAT ASSEMBLY

FIELD OF THE INVENTION

The present invention generally relates to a vehicle seat, and more particularly, to a vehicle seat configured to rotate between forward-facing and rearward-facing configurations within a vehicle interior.

BACKGROUND OF THE INVENTION

A vehicle seat is desired that accommodates rotation within a vehicle interior.

SUMMARY OF THE INVENTION

According to one aspect of the present invention, a seat assembly includes a base frame. A lift mechanism is supported on the base frame. A seatback is operably coupled to a seat portion. The seatback and the seat portion are vertically adjustable as powered by the lift mechanism. The seat portion is pivotally coupled to the seatback by a support bracket for rotational movement between first and second positions. A seat frame of the seat portion is vertically juxtaposed over the lift mechanism when the seat portion is in the second position.

According to another aspect of the present invention, a seat assembly includes a base frame. A swivel mechanism rotatably supports the base frame between forward-facing and rearward-facing configurations. A lift mechanism is operably coupled to the base frame. A seatback and seat portion are supported on the lift mechanism for vertical adjustment therewith. An actuator is operably coupled to the seat portion for driving the seat portion between a horizontal use position and an upright non-use position.

According to yet another aspect of the present invention, a seat assembly includes a base frame. A scissor lift mechanism includes first and second sets of pivotally coupled links disposed on opposite sides thereof. The first and second sets of pivotally coupled links are operably coupled to the base frame at lower portions thereof. The first and second sets of pivotally coupled links are interconnected by front and rear cross members. A seat frame is pivotally supported on the rear cross member of the lift mechanism between first and second positions. A front edge of the seat frame is vertically juxtaposed over the base frame when the seat frame is in the second position. A swivel mechanism is operably coupled to the base frame for moving the seat assembly between forward-facing and rearward-facing configurations.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3A is a top perspective view of a seat portion supported on a lift mechanism in a lowered position;

FIG. 3B is a top perspective view of the seat portion of FIG. 3A with the seat portion in a raised position;

FIG. 3C is a top perspective view of the seat portion of FIG. 3B with the seat portion shown in a raised and stowed position;

FIG. 4B is a bottom perspective view of the seat portion and lift mechanism of FIG. 4A as assembled;

FIG. 4C is a bottom perspective view of the seat portion and lift mechanism of FIG. 4B;

FIG. 7A is a bottom perspective view of the seat portion and lift mechanism of FIG. 6 as assembled;

FIG. 7B is a bottom perspective view of the seat portion and lift mechanism of FIG. 6 as assembled;

DETAILED DESCRIPTION OF THE PREFERRED EMBODIMENTS

Figure 2A:
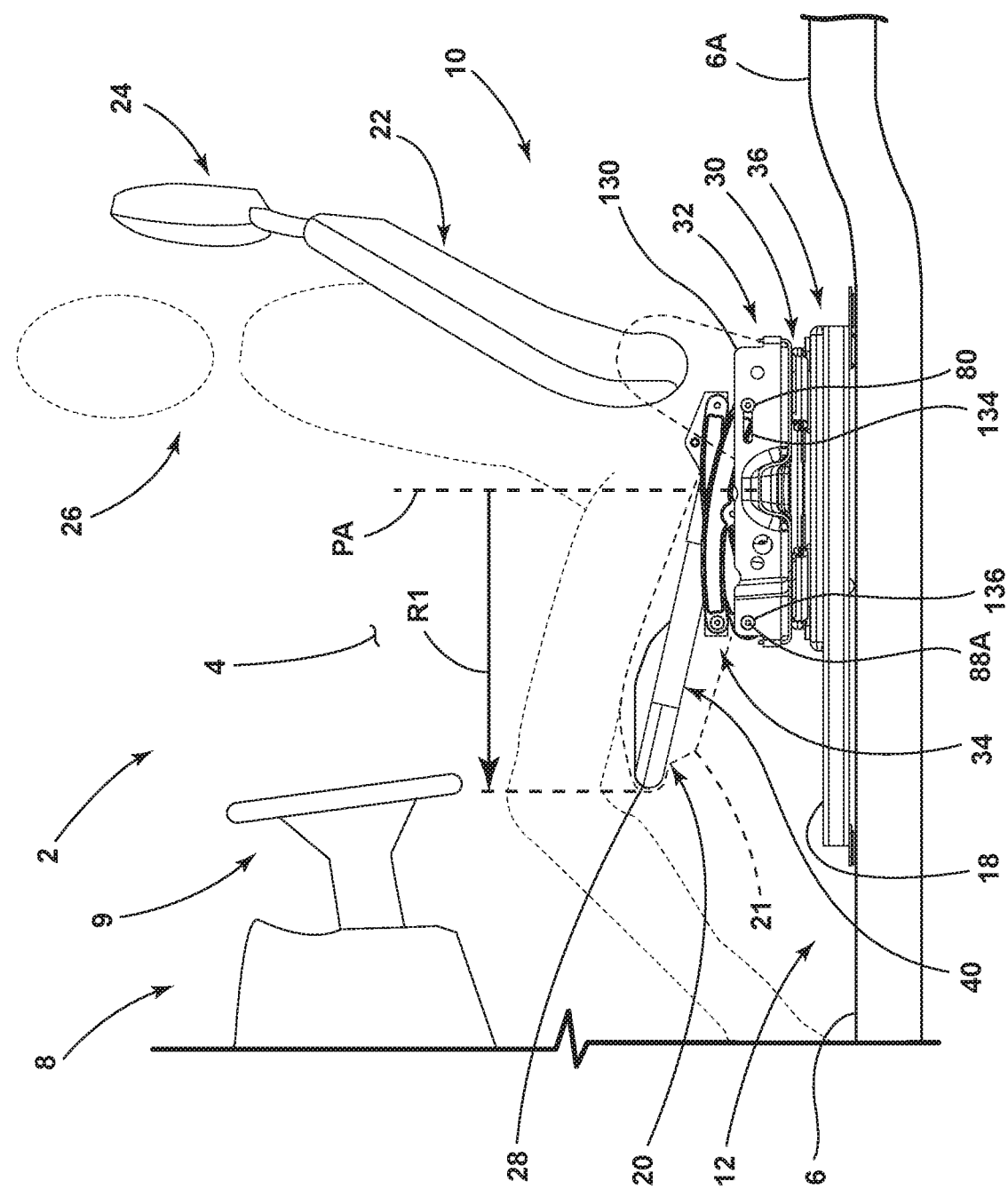
FIG. 2A is a side elevational view of a seat assembly shown in a forward-facing configuration with a seat occupant positioned therein.

For purposes of description herein, the terms "upper," "lower," "right," "left," "rear," "front," "vertical," "horizontal," and derivatives thereof shall relate to the seat assembly as oriented in FIG. 2A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
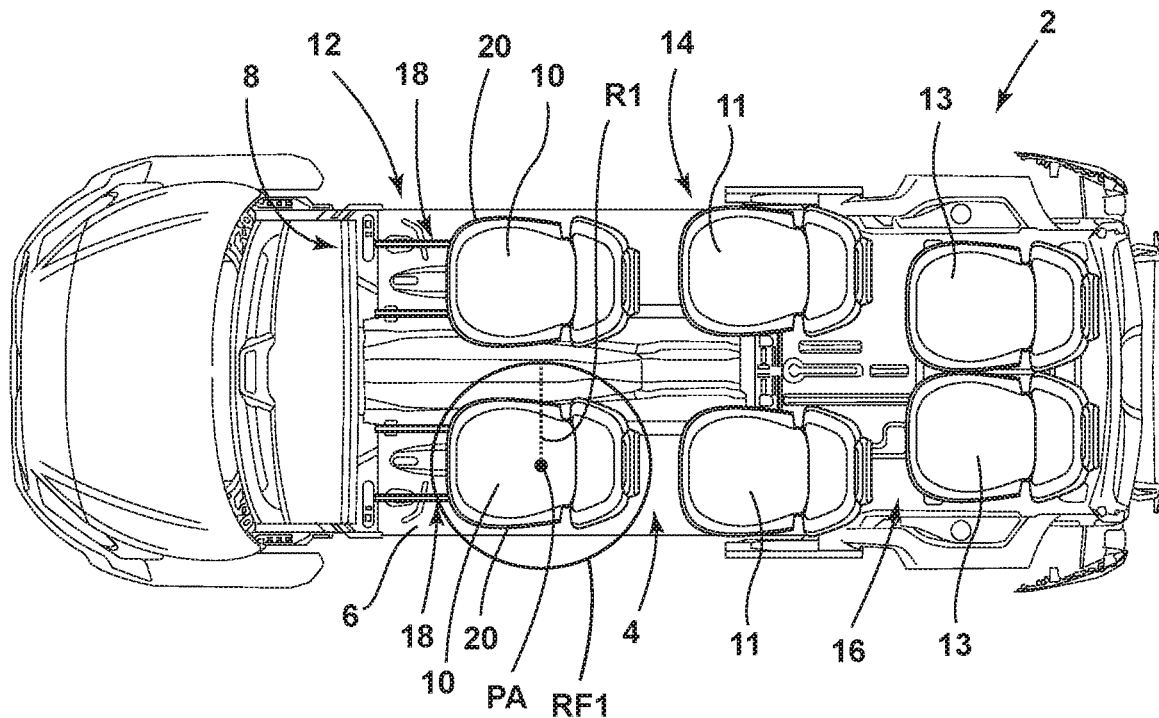
FIG. 1A is a top plan view of a vehicle showing a number of seat assemblies positioned within an interior thereof, wherein a front seat assembly includes a seat portion shown in a deployed position with a rotational footprint indicated.

Referring now to FIG. 1A, a vehicle 2 is shown having a vehicle interior 4. The vehicle interior 4 includes a floorboard 6 and an instrument panel 8. Within the vehicle 2, a plurality of seat assemblies 10, 11 and 13 are shown. The seat assemblies identified with the reference numeral 10 are shown disposed in a front portion 12 of the vehicle interior 4. The seat assemblies identified with reference numeral 11 are shown disposed in an intermediate portion 14 of the vehicle interior 4. The seat assemblies identified with reference numeral 13 are shown disposed in a rear portion 16 of the vehicle interior 4. The seat assemblies 10 shown disposed in the front portion 12 of the vehicle interior 4 are supported on the floorboard 6 by track assemblies 18. The track assemblies 18 are contemplated to provide an extended range of fore and aft movement of the seat assemblies 10 for accommodating forward-facing and rearward-facing configurations. As shown in FIG. 1A, the seat assemblies 10, 11 and 13 of the vehicle 2 are all shown disposed in a forward-facing configuration. For the purposes of this disclosure, the features of the seat assemblies 10, 11 and 13 will be described with reference to seat assemblies 10, however, it is contemplated that the flexibility and pivoting features of the seat assemblies described herein may be featured on other seat assemblies disposed in the intermediate portion 14 or the rear portion 16 of the vehicle interior 4.

With further reference to FIG. 1A, the seat assembly 10 shown on the left side of the front portion 12 of the vehicle 2 has a pivot axis PA indicated thereon. The pivot axis PA defines a rotational footprint RF1 of the seat assembly 10. Specifically, the rotational footprint RF1 is defined by a radius R1 which is further defined between the pivot axis PA and a feature of the seat assembly 10 disposed furthest away from the centrally disposed pivot axis PA. As used herein, the term, "rotational footprint" identifies an area in which a seat assembly occupies as it rotates from a forward-facing configuration to a rearward-facing configuration within a vehicle interior. Thus, with the seat assembly 10 shown in the configuration of FIG. 1A, the seat assembly 10 includes a first rotational footprint RF1 based on a centrally disposed pivot axis PA. In the embodiment shown in FIG. 1A, it is contemplated that the left hand seat assembly 10 includes a rotational footprint RF1, provided by its current configuration that is too large for rotation within the interior 4 of the vehicle 2. Particularly, the rotational footprint RF1 is generally defined in FIG. 1A by the parameters of a deployed seat portion 20. With reference to the seat portion 20, the terms "stowed" and "deployed" "use position" and "upright non-use position," and first and second positions may be used to describe different positions of the seat portion 20. In FIG. 1A, the seat portion 20 is shown in a deployed position, that is a substantially horizontal use position with the overall seat assembly 10 shown in a forward-facing configuration. In FIG. 1A, the seat assembly 10 is configured to support a vehicle occupant in a forward-facing configuration on the deployed seat portion 20.

Figure 1B:
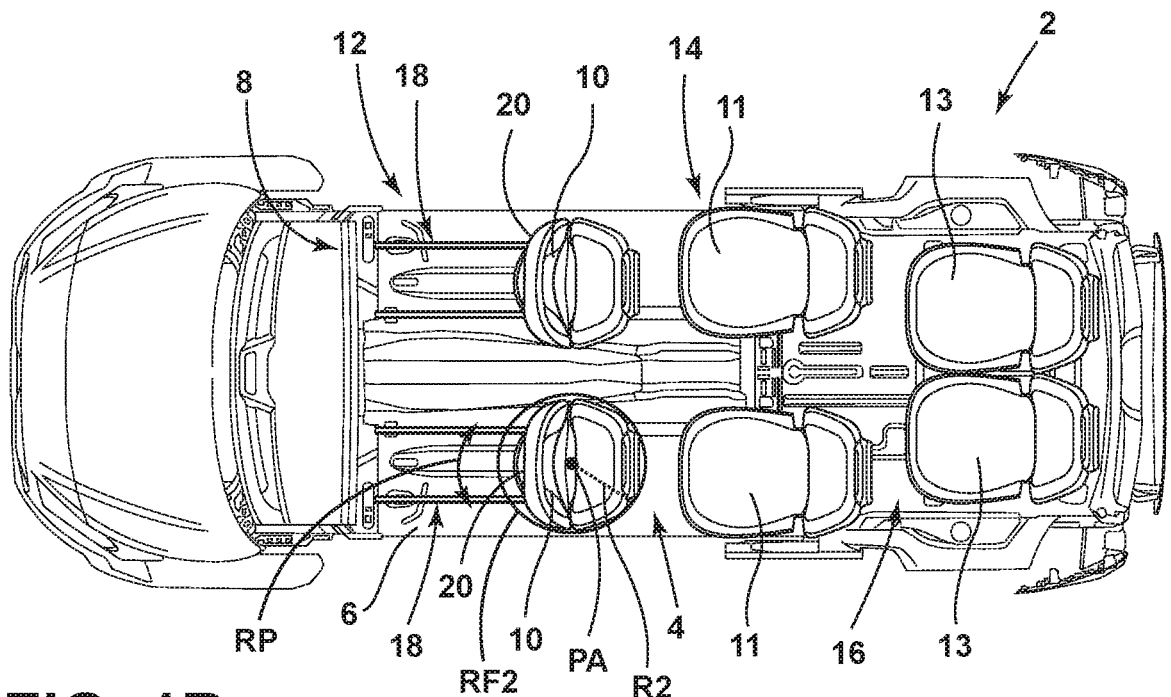
FIG. 1B is a top plan view of the vehicle of FIG. 1A with the front seat assemblies shown with the seat portion in a stowed position and a rotational footprint indicated that is less than the rotational footprint of FIG. 1A.

Referring now to FIG. 1B, the seat assemblies 10 disposed in the front portion 12 of the vehicle 2 are shown with the seat portions 20 thereof in stowed positions. As noted above, the seat assemblies 10 include seat portions 20 that are convertible between deployed and stowed positions. With the seat portion 20 in the stowed position, the overall seat assembly 10 includes a rotational footprint RF2 which is defined between the centrally disposed pivot axis PA and a radius R2 defined between the centrally disposed pivot axis PA and a feature of the seat assembly 10 disposed furthest therefrom. In comparing FIG. 1A and FIG. 1B, the rotational footprint RF2 of FIG. 1B is less than the rotational footprint RF1 of the seat assembly 10 shown in FIG. 1A. In this way, it is contemplated that the seat assembly 10 can rotate within the interior 4 of the vehicle 2 along the pivot axis PA between forward and rearward-facing configurations. Specifically, the movement of the seat portion 20 from the deployed position (FIG. 1A) to the stowed position (FIG. 1B) provides for a rotational footprint RF2 that can accommodate the pivoting movement of the seat assembly 10 within the vehicle interior 4. Having a rotational footprint RF2 when the seat portion 20 is in the stowed position provides for a seat assembly 10 that can rotate between forward-facing and rearward-facing configurations within the tight confines of the vehicle interior 4. When the seat portion 20 is in the deployed position, as shown in FIG. 1A, the rotational footprint RF1 is much greater than the rotational footprint RF2 shown in FIG. 1B, such that is contemplated that the seat portion 20 would contact a pillar, center console, door panel, or other like feature within the vehicle interior 4, thereby limiting the seat assembly's ability to rotate.

Figure 1C:
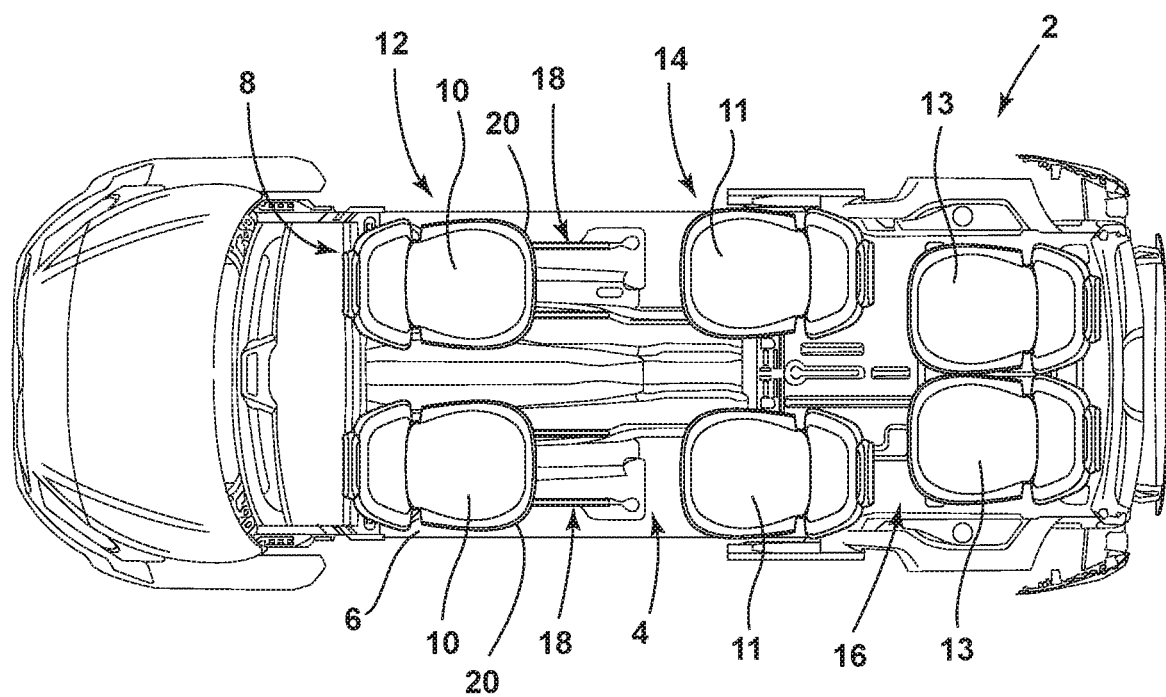
FIG. 1C is a top plan view of the vehicle of FIG. 1B showing the front seat assemblies in rearward-facing configurations.

Referring now to FIG. 1C, the front seat assemblies 10 are shown with the seat portions 20 thereof in the deployed positions with the overall seat assemblies 10 now positioned in a rearward-facing configuration. Thus, from FIG. 1B to FIG. 1C, it is contemplated that the seat assemblies 10 have rotated along the rotational path indicated by arrow RP (FIG. 1B) within the rotational footprint RF2 to provide a rearward-facing configuration for the seat assemblies 10. After rotation, it is contemplated that the seat portions 20 are moved from the stowed position (FIG. 1B) to the rearward-facing deployed position (FIG. 1C). Further, in comparing the seat assemblies' position in FIG. 1B to FIG. 1C, the seat assemblies 10 are also shown moved to a forward position along the track assemblies 18 for providing adequate legroom within the vehicle interior 4 for a seat occupant in a rearward-facing configuration.

Referring now to FIG. 2A, the seat assembly 10 is shown disposed within the vehicle interior 4 of the vehicle 2 at the front portion 12 of the vehicle 2. The instrument panel 8 of the vehicle 2 in the embodiment shown in FIG. 2A includes a steering wheel assembly 9 extending outwardly therefrom. In FIG. 2A, a seat occupant 26 is shown positioned within the seat assembly 10 in a seated position with the seat portion 20 of the seat assembly 10 in the deployed position. The seat portion 20 includes a seat frame 40 that provides structural support for the seat occupant 26. The seat frame 40 is covered by cushion materials 21 that is shown in phantom in FIGS. 2A-2C. In FIG. 2A, a swivel mechanism 30 is shown mounted on a mounting plate 36 that is slideably supported on the track assembly 18 between fore and aft positions. The swivel mechanism 30 is configured to provide the pivoting movement of the seat assembly 10 between the forward-facing and rearward-facing configurations. A base frame 32 is mounted on the swivel mechanism 30 for rotational movement therewith. In the embodiment shown in FIG. 2A, a lift mechanism 34 is shown disposed between the seat portion 20 and the base frame 32. The lift mechanism 34 is configured to provide vertical adjustment of the seat portion 20 between raised and lowered positions. In FIG. 2A, the seat portion 20 is shown in a lowered position. In the embodiment of FIG. 2A, the lift mechanism 34 is configured to vertically adjust the position of the seat portion 20 of the seat assembly 10. However, the lift mechanism 34 of the seat assembly 10 shown in FIG. 2A is not configured to vertically adjust a seatback 22 or a headrest assembly 24 of the seat assembly 10. In this way, it is contemplated that only the seat portion 20 vertically adjusts using the lift mechanism 34. With the swivel mechanism 30 coupled to the base frame 32 of the seat assembly 10, the entire seat assembly 10 is configured to rotate along the pivot axis PA which is centrally disposed on the swivel mechanism 30. In FIG. 2A, a radius R1 is defined between the centrally disposed pivot axis PA and a front edge 28 of the seat portion 20. Thus, it is contemplated that the front edge 28 of the seat portion 20 defines the furthest point, or forward-most portion, of the seat assembly 10 from the pivot axis PA to define the rotational footprint RF1 (FIG. 1A) of the seat assembly 10. The front edge 28 of the seat portion 20 may be defined by a front edge 42 (FIGS. 3A-3C) of the seat frame 40, or may be a forward-most portion of the cushion materials 21 as coupled to the seat frame 40. As further shown in FIG. 2A, the floorboard 6 of the vehicle 2 includes a raised rear portion 6A which is configured to support seat assemblies 11 (FIG. 1A) at the intermediate portion 14 of the vehicle interior 4.

Figure 2B:
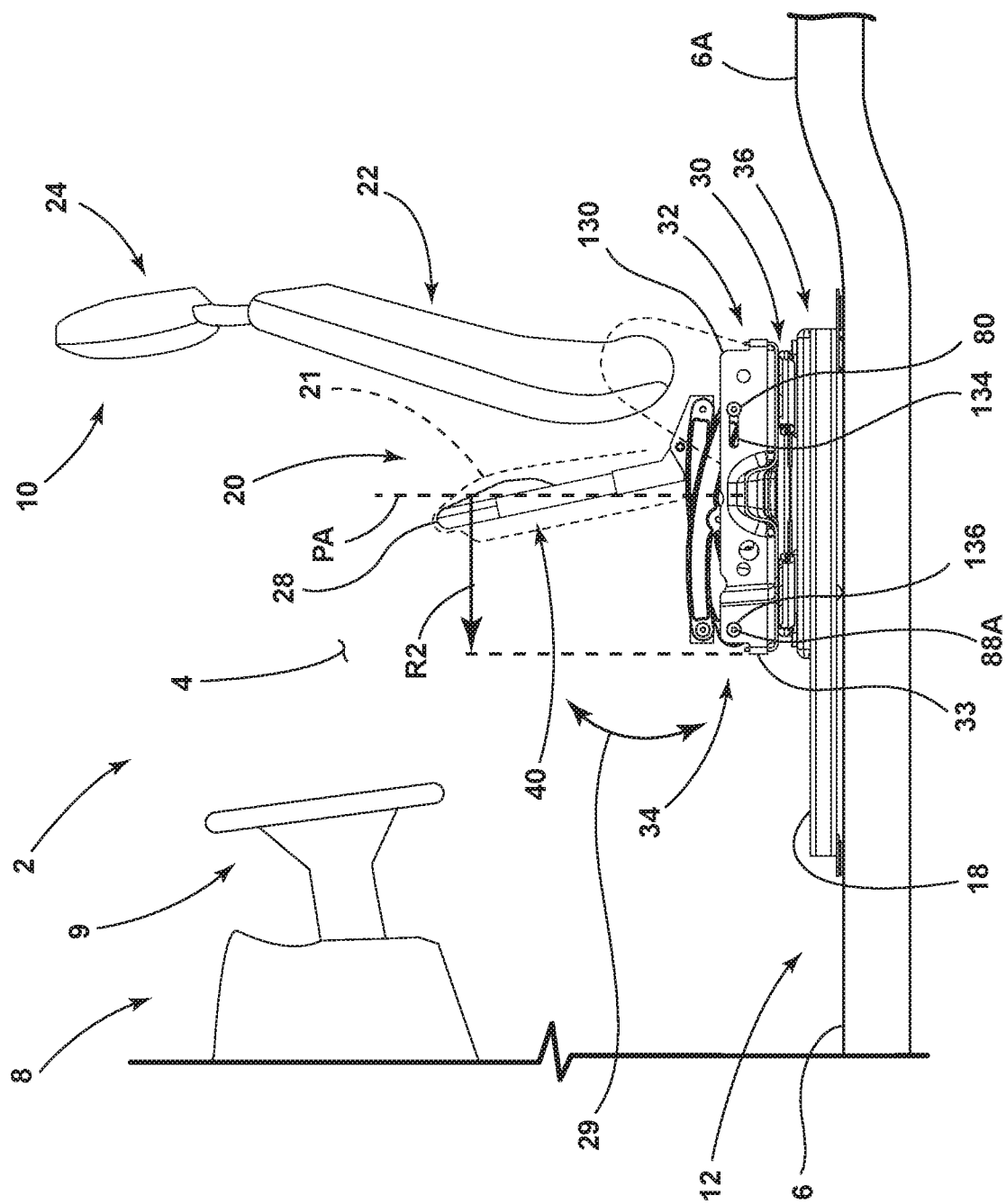
FIG. 2B is a side elevational view of the seat assembly of FIG. 2A with the seat portion shown in a stowed position.

Referring now to FIG. 2B, the seat assembly 10 is shown with the seat portion 20 disposed in the stowed position. It is contemplated that the seat portion 20 moves from the deployed position (FIG. 2A) to the stowed position (FIG. 2B) by pivoting upward along the path as indicated by arrow 29. As further described below, a rear portion of the seat portion 20 is pivotally coupled to the lift mechanism 34 for movement between the stowed and deployed positions. Further, the seatback 22 has been moved from a partially reclined use position (FIG. 2A) to an upright position to further reduce the rotational footprint of the seat assembly 10. In FIG. 2B, the radius R2 is defined between the centrally disposed pivot axis PA and a forward-most portion of the seat assembly 10, which is contemplated to be a front edge 33 of the base frame 32, or may be any perimeter edge of the base frame 32. Thus, the radius R2 is used to define the rotational footprint RF2 (FIG. 1B) of the seat assembly 10 to minimize the rotational footprint of the seat assembly 10 for rotation within the vehicle interior 4. As further shown in FIG. 2B, the front edge 28 of the seat portion 20 is vertically juxtaposed over the lower portion of the seat assembly 10. The lift mechanism 34, the base frame 32 and the swivel mechanism 30 define the lower portion of the seat assembly 10. As used herein, the term "vertically juxtaposed" is used to describe a component or feature that is positioned vertically above and over another feature. Specifically, the front edge 28 of the seat portion 20 is shown vertically disposed above the lift mechanism 34, such that the front edge 28 is vertically juxtaposed over the lift mechanism 34. In comparison, the front edge 28 of the seat portion 20 is shown in FIG. 2A as being vertically above the lift mechanism 34, however, the front edge 28 of the seat portion 20 is shown in FIG. 2A as being positioned in a forward position relative to the lift mechanism 34. In FIG. 2B, the front edge 28 of the seat portion 20 is disposed above and over the lift mechanism 34, such that the front edge 28 of the seat portion 20 shown in FIG. 2B is vertically juxtaposed over the lift mechanism 34 when the seat portion 20 is in the stowed position. Put differently, the components of the lower portion of the seat assembly 10 have a footprint. These components includes the mounting plate 36, the lift mechanism 34, the base frame 32 and the swivel mechanism 30. When the seat portion 20, or the front edge 28 of the seat portion 20, is vertically juxtaposed to any one of the aforementioned components, the seat portion 20, and/or the front edge 28 thereof, is contemplated to be vertically positioned above and within the footprint of the referenced component.

As noted above, the seat portion 20 of the seat assembly 10 is configured to pivotally move between the deployed position (FIG. 2A) and the stowed position (FIG. 2B) along the path as indicated by arrow 29 (FIG. 2B). The deployed position of the seat portion 20 provides for an upper surface configured for supporting a seat occupant thereon. As such, the deployed position of the seat portion 20 may be referred to herein as a "use position" or a "horizontal use position." With further reference to FIG. 2B, the seat portion 20 is shown in the stowed position, which may also be referred to herein as the "upright non-use position." The seat portion 20 is considered to be in a non-use position when the seat portion 20 is in the stowed position due to the highly increased angle of the seat portion 20 when in the stowed position. Thus, while known seat assemblies may provide for a seat portion that can adjust to provide various angled configurations, the seat assembly 10 of the present concept provides for a seat portion 20 which can move to an upright non-use position, wherein a front edge 28 thereof is vertically juxtaposed over a lift mechanism 34, a base frame 32 and/or a swivel mechanism 30. Such dynamic angle adjustment of a seat portion is not found in seat assemblies which provide for fine tuning the angle of the seat portion for comfort adjustments. With this range of movement, the seat portion 20 of the present concept provides for a seat portion that can effectively reduce the rotational footprint of the overall seat assembly 10 for accommodating pivoting movement of the seat assembly 10 within a vehicle interior.

Figure 2C:
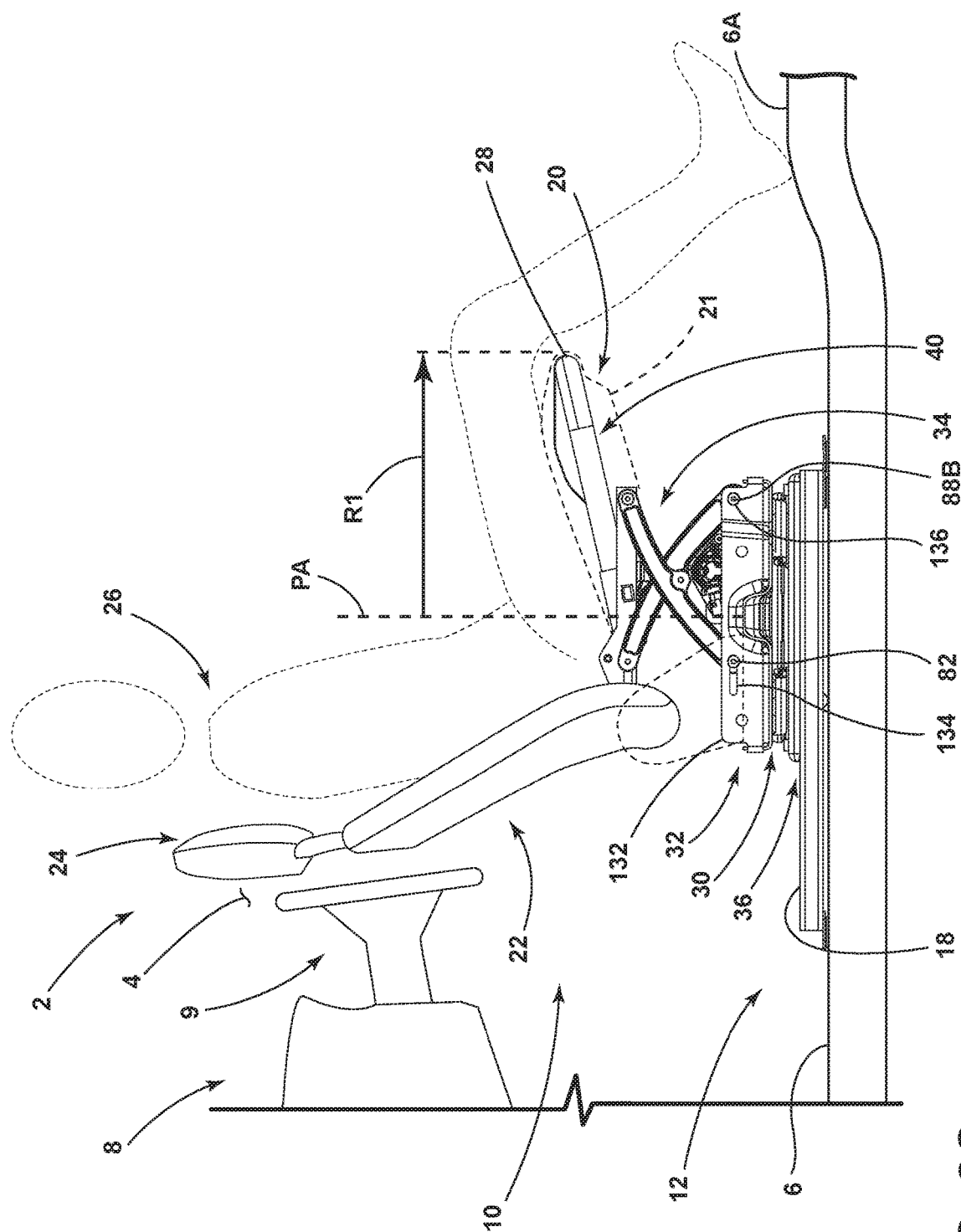
FIG. 2C is a side elevational view of the vehicle seat of FIG. 2A with the vehicle seat in a rearward-facing configuration.

Referring now to FIG. 2C, the seat occupant 26 is shown seated in the seat assembly 10 in a rearward-facing configuration. As seated in the seat assembly 10, the feet of the seat occupant 26 are positioned on the raised portion 6A of the floorboard 6. As such, the seat portion 20 has been raised to a raised position by the lift mechanism 34 to accommodate for the seat occupant's feet being supported on a raised portion 6A of the floorboard 6. With the seat portion 20 shown in the deployed or use position in FIG. 2C, the seat assembly 10 includes a radius R1 defined between the centrally disposed pivot axis PA and the front edge 28 of the seat portion 20 which is no longer vertically juxtaposed over the lift mechanism 34, but rather extending forward from the lift mechanism 34 above the lift mechanism 34. It is further contemplated that in the rearward-facing configuration, the seat assembly 10 may be disposed on a side of the front portion 12 of the vehicle interior 4 where the seat assembly 10 can move towards the instrument panel 8 on the track assembly 18 to provide more legroom for other occupants that may be seated in seat assemblies positioned in the intermediate portion 14 of the vehicle 2, such as seat assemblies 11 shown in FIG. 1A.

Referring now to FIG. 3A, the seat portion 20 of the above-described seat assembly 10 is shown with the cushion material 21 removed therefrom to reveal the seat frame 40. With the cushion material 21 removed, the seat frame 40 may be used to define the furthest points, or forward-most portions, of the seat assembly 10 from the centrally disposed pivot axis PA for defining a rotational footprint of the seat frame 40. Specifically, the seat frame 40 includes a front edge 42 and first and second ends 44, 46. The front edge 42 is disposed between the first and second ends 44, 46 which cooperate to define a centrally disposed window 50. An interconnecting support member 48 is disposed between the front edge 42 and the first and second ends 44, 46 for supporting a seat occupant thereon. As further shown in FIG.

3A, the front edge 42 includes first and second corner portions 42A, 42B. It is contemplated that the corner portions 42A, 42B of the front edge 42 of the seat frame 40 may define the furthest-most portions of the seat portion 20 from the centrally disposed pivot axis PA for defining a radius used to determine the rotational footprint of the seat portion 20. As further shown in FIGS. 3A-3C, the seat portion 20 is supported on the track assembly 18 having first and second tracks 18A, 18B. Specifically, the mounting plate 36 is slideably coupled to the track assembly 18 on opposite sides thereof for fore and aft movement along the spaced-apart first and second tracks 18A, 18B. The swivel mechanism 30, further described below, is operably coupled to the mounting plate 36 for providing the pivoting movement along the pivot axis PA. The base frame 32 is rotatably mounted on the swivel mechanism 30 for rotating along the pivot axis PA. In FIGS. 3A-3C, the lift mechanism 34 is shown operably coupled between the base frame 32 and the seat frame 40. The lift mechanism 34 is a scissor lift mechanism operable between raised and lowered positions. In FIG. 3A, the lift mechanism 34 is in a lowered position, while the lift mechanism 34 is shown in a raised position in FIGS. 3B and 3C. With specific reference to FIG. 3B, the centrally disposed pivot axis PA is shown having a radius R1 defined between the pivot axis PA and corner portion 42A of the front edge 42 of the seat frame 40. As specifically shown in FIG. 3C, the seat frame 40 is shown in the raised upright non-use position or stowed position. The seat frame 40 pivots along pivot axis PA2 in the direction as indicated by arrow 51 (FIGS. 3A and 3C) in moving from the deployed position (FIGS. 3A and 3B) to the stowed position (FIG. 3C). Thus, in the embodiment shown in FIG. 3C, the seat frame 40 is in a position wherein the rotational footprint of the seat portion 20 of the seat assembly 10 is reduced to a rotational footprint defined by a radius R2 between the centrally disposed pivot axis PA and a front edge 33 of the base frame 32, as specifically shown in FIG. 2B.

Figure 4A:
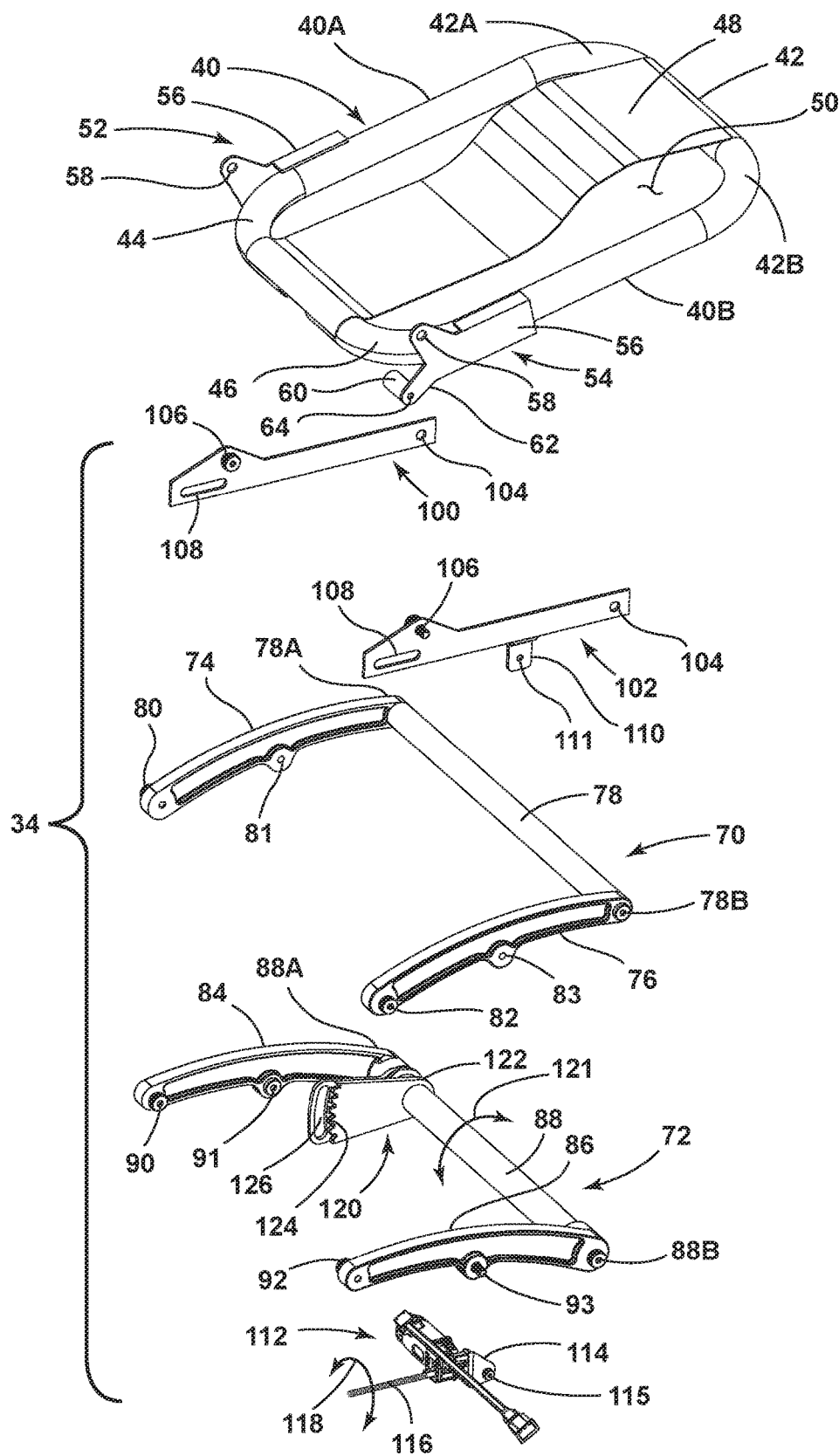
FIG. 4A is an exploded top perspective view of the seat portion and lift mechanism of FIG. 3A.

Referring now to FIG. 4A, the lift mechanism 34 is shown in an exploded view away from the seat frame 40. In an assembled condition, the lift mechanism 34 is operably coupled between the base frame 32 and the seat portion 20 for adjusting a vertical position of the seat portion 20 relative to the base frame 32, as shown in FIGS. 2A-2C. As specifically shown in FIG. 4A, the seat frame 40 includes first and second pivot brackets 52, 54 which each include a mounting portion 56 having a generally C-shaped configuration for coupling to upper and lower sides 40A, 40B of the seat frame 40. The pivot brackets 52, 54 further include pivot apertures 58 for pivotally coupling the seat frame 40 to the lift mechanism 34. As further shown in FIG. 4A, the second pivot bracket 54 includes a threaded member 60 mounted to a mounting tab 62 of the second pivot bracket 54. The threaded member 60 includes a threaded aperture 64 for threadlingly engaging a threaded drive shaft of an actuator, as further described below. In use, the threaded member 60 is provided to work in conjunction with an actuator to drive movement of the seat frame 40 between the use and upright non-use positions. It is contemplated that the threaded member 60 may be disposed on either of the first and second pivot brackets 52, 54, or both. As used herein, the term "threaded member" is meant to describe a feature of the seat assembly 10 having a threaded aperture that can be threadingly engaged by a threaded drive shaft.

With further reference to FIG. 4A, the lift mechanism 34 is shown as a scissor lift mechanism having a first lift member 70 and a second lift member 72. The first lift member 70 includes a first link 74 and a second link 76 spaced-apart from one another and interconnected at front portions thereof by a front cross member 78. The first and second links 74, 76 of the first lift member 70 include pivot points 80, 82, respectively, for slideably mounting the rear portions of the first and second links 74, 76 to the base frame 32 of the seat assembly 10, as shown in FIGS. 4B and 4C. The first and second links 74, 76 further include centrally disposed pivot points 81, 83, respectively, for pivotally coupling the first lift member 70 to the second lift member 72. With reference to the second lift member 72, the second lift member 72 includes first and second links 84, 86 which are spaced-apart from one another and interconnected by a front cross member 88 at front portions of the first and second links 84, 86. Like the first lift member 70, the first and second links 84, 86 of the second lift member 72 include pivot points 90, 92, respectively, which are used to slideably couple the second lift member 72 to first and second upper brackets 100, 102 of the lift mechanism 34. The first and second links 84, 86 of the second lift member 72 further include centrally disposed pivot points 91, 93 for pivotally coupling to the first and second links 74, 76 of the first lift member 70. In this way, a scissor lift mechanism is provided between the first and second lift members 70, 72. As noted above, the lift mechanism 34 includes upper brackets 100, 102 which each include a front pivot aperture 104, an upper pivot aperture 106 and a rear slot 108 disposed therethough. The rear slots 108 of the upper brackets 100, 102 are configured to couple to the pivot points 90, 92 of the first and second links 84, 86 of the second lift member 72 for fore and aft movement along the rear slots 108. The upper pivot apertures 106 are configured to couple to the pivot apertures 58 of the first and second pivot brackets 52, 54 of the seat frame 40 for pivotally mounting the seat frame 40, and the seat portion 20 of the seat assembly 10, to the lift mechanism 34 between the use and upright non-use position. The front pivot apertures 104 of the upper brackets 100, 102 are configured to couple to pivot points 78A, 78B of the first and second links 74, 76 of the first lift member 70 to provide pivoting movement of the first lift member 70 relative to the upper brackets 100, 102. Similarly, the second lift member 72 includes pivot points 88A, 88B that are configured to mount to pivot apertures of the base frame 32 of the seat assembly 10, as further described below.

As further shown in FIG. 4A, the second upper bracket 102 of the lift mechanism 34 includes a mounting tab 110 downwardly extending therefrom. The mounting tab 110 is used to mount an actuator 112 thereto. The actuator 112 includes a mounting bracket 114 having a fastener 115 that pivotally mounts the actuator 112 to the mounting tab 110 of the second upper bracket 102 at mounting aperture 111. As further shown in FIG. 4A, the actuator 112 includes a threaded drive shaft 116 extending outwardly therefrom and configured for rotation along the path as indicated by arrow 118. In use, the drive shaft 116 of the actuator 112 is configured to threadingly engage the threaded member 60 of the seat frame 40 at the threaded aperture 64 thereof to drive the pivoting movement of the seat frame 40 between the deployed use position and the upright non-use or stowed position. Specifically, the threaded member 60 being threadingly engaged with the drive shaft 116 of the actuator 112 provides for movement of the threaded member 60 along a length of the drive shaft 116 as the drive shaft 116 rotates, such that the rear portion of the seat frame 40 pivots along the pivot axis PA2 shown in FIGS. 3A and 3C. While the rear portion of the seat frame 40 pivots along the pivot axis PA2, the front portion or front edge 42 of the seat frame 40 moves upwardly along the path as indicated by arrow 29 shown in FIG. 2B.

With further reference to FIG. 4A, the front cross member 88 of the second lift member 72 includes a rearwardly extending bracket 120 that is fixedly coupled to the front cross member 88 at a mounting portion 122 thereof. The bracket 120 includes a sector portion 124 and a guide slot 126 disposed therethrough. In use, the rearwardly extending bracket 120 is configured to engage an actuator 128 (FIGS. 4C and 4D) for driving the lift mechanism 34 between the raised and lowered positions by rotating the cross member 88 along the rotational path indicated by arrow 121, as further described below.

Referring now to FIG. 4B, the first and second lift members 70, 72 are coupled together at the first and second links 74, 76 and 84, 86 thereof. In FIG. 4B, portions of the base frame 32 are shown as first and second sides 130, 132. The first side 130 of the base frame 32 includes a rear slot 134 in which pivot point 80 of the first link 74 of the first lift member 70 is slideably received. This connection is further shown in FIGS. 2A and 2B. As further shown in FIG. 4B, pivot point 92 is slideably received in rear slot 108 of upper bracket 102 of the lift mechanism 34. As further shown in FIG. 4B, the actuator 112 is shown coupled to the upper bracket 102 at the interconnection of mounting tab 110 and mounting bracket 114. With the seat frame 40 shown in the deployed or use position, the drive shaft 116 of the actuator 112 has engaged the threaded member 60 at an extended engagement. It is contemplated that the drive shaft 116 of the actuator 112 will rotate to drive the threaded member 60 towards the actuator 112 in order to lift the seat frame 40 to the stowed or upright non-use position.

Referring now to FIG. 4C, pivot point 82 of the second link 76 of the first lift member 70 is shown engaged with a rear slot 134 of the second side 132 of the base frame 32. Pivot point 88B of the second lift member 72 is shown engaged with a pivot aperture 136 of the second side 132 of the base frame 32. The interconnection of pivot points 82 and 88B is further shown in the illustration of the seat assembly 10 of FIG. 2C. As further shown in FIG. 4C, pivot point 90 of the first link 84 of the second lift member 72 is engaged with the rear slot 108 of the first upper bracket 100 of the lift mechanism 34. As further shown in FIG. 4C, the first side 130 of the base frame 32 includes a mounting bracket 138 to which actuator 128 is mounted. As noted above, actuator 128 is configured to engage the sector portion 124 of bracket 120 of the second lift member 72 for driving the lift mechanism 34 between the raised and lowered positions, as specifically shown in FIG. 4D.

Figure 4D:
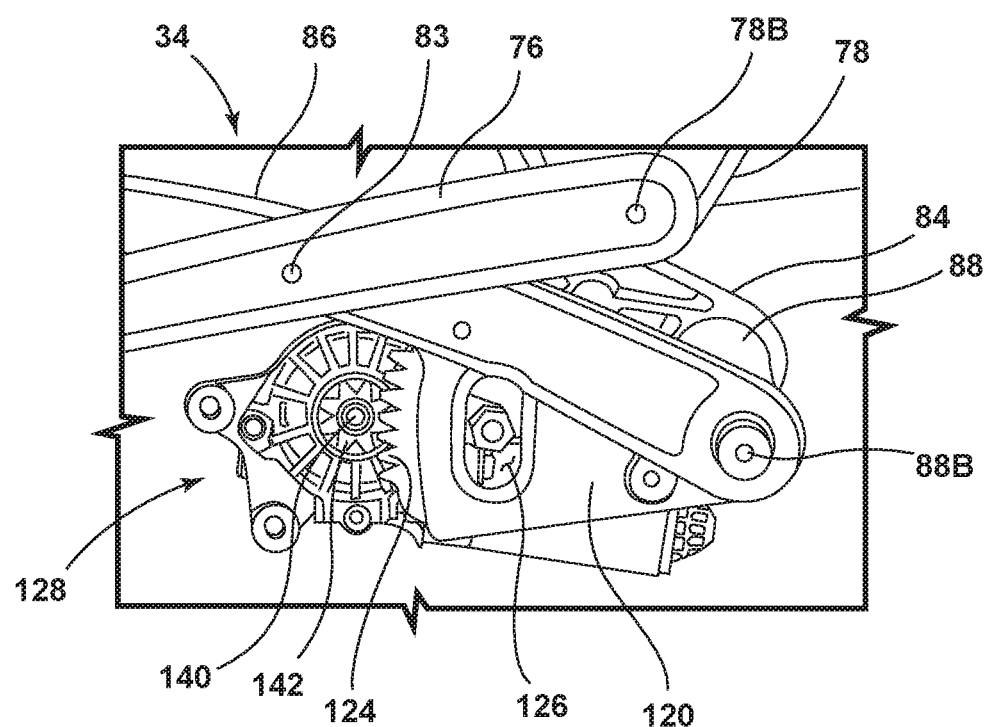
FIG. 4D is a fragmentary side elevation view of an actuator coupled to the lift mechanism of FIG. 4B.

Referring now to FIG. 4D, the actuator 128 is shown engaged with the lift mechanism 34. In FIG. 4D, the first side 130 of the base frame 32, and the mounting bracket 138 thereof, have been removed to reveal a driveshaft 140 of the actuator 128 with a spur gear 142 disposed thereon. The spur gear 142 is shown gearingly engaged with the sector portion 124 of rearwardly extending bracket 120. Thus, as the actuator 128 drives rotation of the spur gear 142 as engaged with the sector portion 124 of the rearwardly extending bracket 120, the bracket 120 will rotate to lift and lower the seat portion 20 as supported on the lift mechanism 34. As found in the embodiment of FIG. 4D, the guide slot 126 is disposed rearwardly of the sector portion 124. It is contemplated that the guide slot 126 can also be positioned forward of the sector portion 124 along the bracket 120, as shown in FIG. 4A. In use, the guide slot 126 is contemplated to receive a guide member therethrough that is coupled between the mounting bracket 138 and the actuator 128 to guide rotational movement of the bracket 120.

Figure 5A:
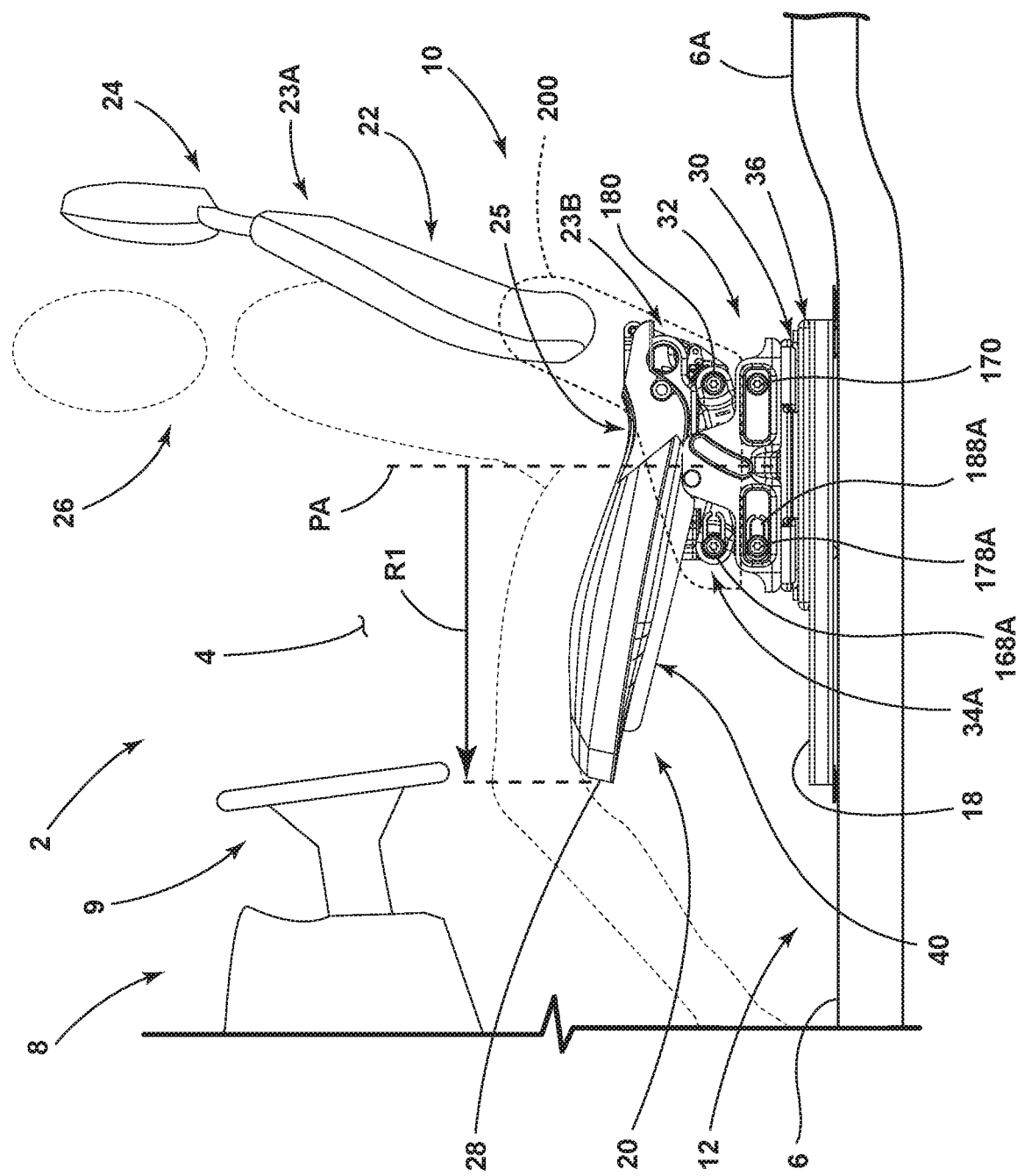
FIG. 5A is a side elevational view of a seat assembly shown in a forward-facing configuration with a seat occupant positioned therein.

Referring now to FIG. 5A, the seat assembly 10 is shown disposed within the vehicle interior 4 of the vehicle 2 at the front portion 12 of the vehicle 2 with a seat occupant 26 positioned within the seat assembly 10 in a forward-facing configuration. The seat assembly 10 shown in FIGS. 5A-5C includes numerous features that are similar or the same as the seat assembly 10 described above with reference to FIGS. 2A-2C, such that like reference numerals are used to describe shared features. In FIG. 5A, the seat portion 20 is shown supported on a lift mechanism 34A in a lowered position with a seatback 22 coupled to the seat portion 20 by as support bracket 200 shown in phantom. A headrest assembly 24 is supported on an upper portion 23A of the seatback 22. In the embodiment of FIG. 5A, the lift mechanism 34A is configured to vertically adjust the position of the seat portion 20 of the seat assembly 10, as well as vertically adjust the seatback 22 and headrest assembly 24 of the seat assembly 10 as coupled thereto. In this way, it is contemplated that the entire seat assembly 10 vertically adjusts using the lift mechanism 34A. With the swivel mechanism 30 coupled to the base frame 32 of the seat assembly 10, the entire seat assembly 10 is configured to rotate along the pivot axis PA which is centrally disposed on the swivel mechanism 30. In FIG. 5A, a radius R1 is defined between the centrally disposed pivot axis PA and a front edge 28 of the seat portion 20. Thus, it is contemplated that the front edge 28 of the seat portion 20 defines the furthest point, or forward-most portion, of the seat assembly 10 from the pivot axis PA to define the rotational footprint RF1 (FIG. 1A) of the seat assembly 10.

Figure 5B:
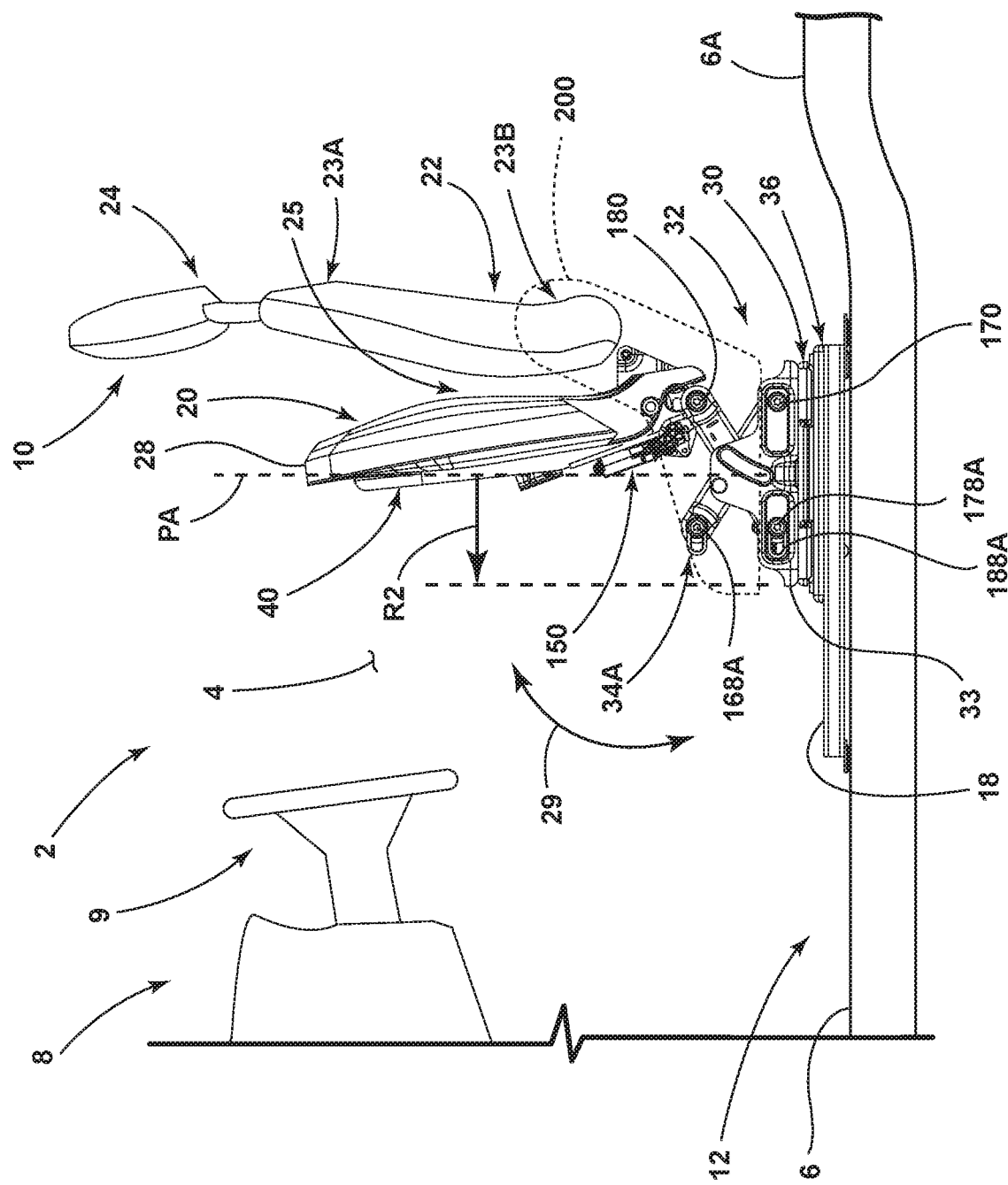
FIG. 5B is a side elevational view of the seat assembly of FIG. 5A with the seat assembly in a rearward-facing configuration and with the seat portion shown in a stowed position.

Referring now to FIG. 5B, the seat assembly 10 is shown with the seat portion 20 disposed in the stowed position. As noted above, the seat portion 20 moves from the deployed position (FIG. 5A) to the stowed position (FIG. 5B) by rotating upward along the path as indicated by arrow 29. As further described below, a rear portion of the seat portion 20 is pivotally coupled to the seatback 22 for movement between the stowed and deployed positions. Further, the seatback 22 has been moved from a partially reclined use position (FIG. 5A) to an upright position to further reduce the rotational footprint of the seat assembly 10. In FIG. 5B, the radius R2 is defined between the centrally disposed pivot axis PA and a forward-most portion of the seat assembly 10, which is contemplated to be a front edge 33 of the base frame 32. Thus, the radius R2 is used to define the rotational footprint RF2 (FIG. 1B) of the seat assembly 10 to minimize the overall rotational footprint of the seat assembly 10 for rotation within the vehicle interior 4. As further shown in FIG. 5B, the front edge 28 of the seat portion 20 and the seat frame 40 of the seat portion 20 are vertically juxtaposed over the lift mechanism 34A with the seat portion 20 in the stowed position. Movement of the seat portion 20 between the deployed and stowed positions is contemplated to be a powered movement driven by an actuator 150 that is coupled between the seat portion 20 and a support bracket interconnecting the seat portion 20 with the seatback 22, as further described below and best shown in FIG. 7C. When the seat portion 20 is in the stowed position shown in FIG. 5B, the front portion or front edge 28 of the seat portion 20 is disposed adjacent to the upper portion 23A of the seatback 22. A rear portion 25 of the seat portion 20 is disposed adjacent to a lower portion 23B of the seatback 22 when the seat portion 20 is in both the deployed position and the stowed position, as the rear portion 25 of the seat portion 20 is pivotally coupled to the seatback 22 via an interconnecting support bracket.

Figure 5C:
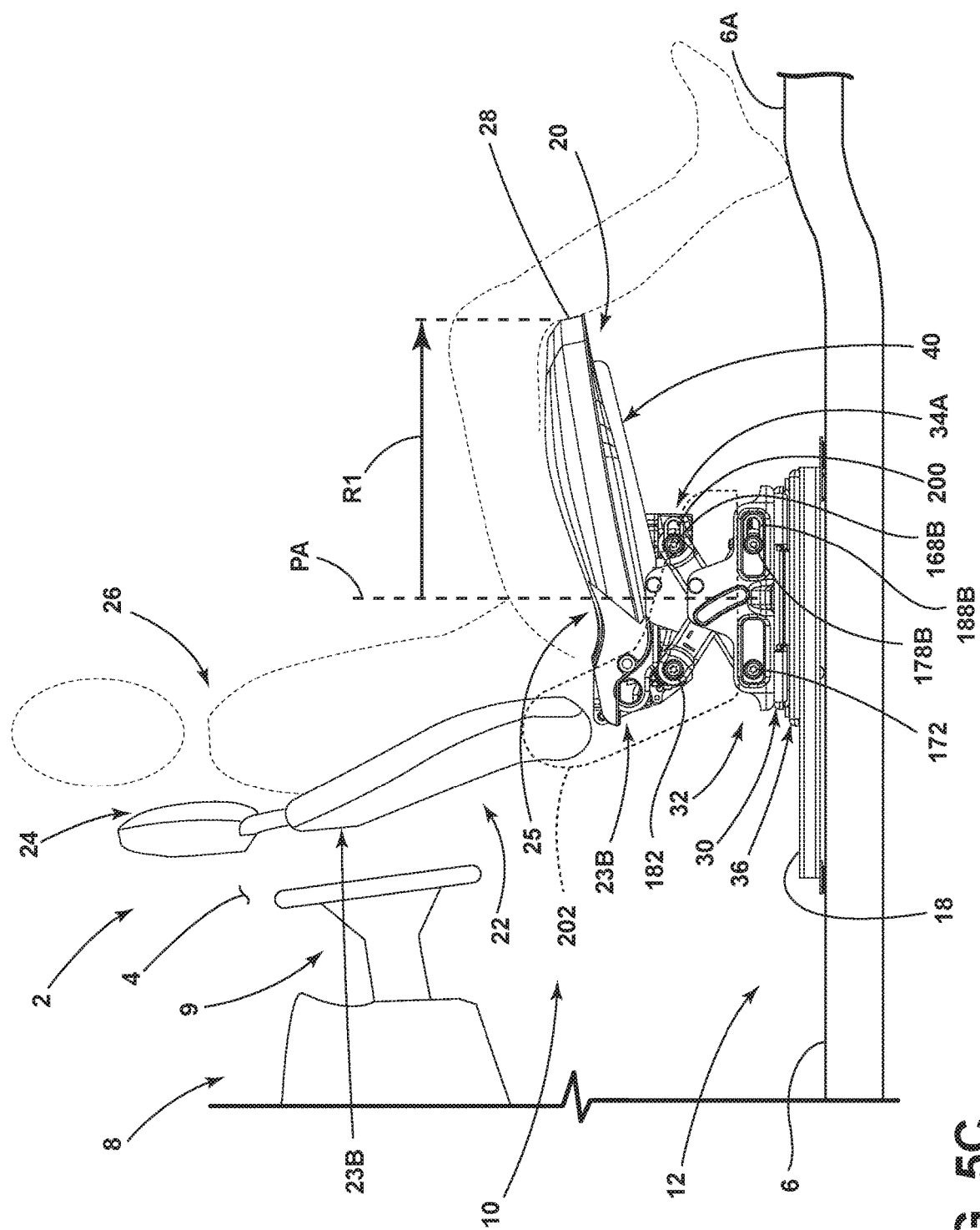
FIG. 5C is a side elevational view of the vehicle seat of FIG. 5B with the seat portion in a deployed position.

With further reference to FIG. 5B, the seat assembly 10 has the reduced rotational footprint (RF2 shown in FIG. 1B), such that the seat assembly 10 can now rotate from the forward-facing configuration (FIG. 5B) to the reward-facing configuration (FIG. 1B). Once the seat assembly 10 has fully rotated, the seat portion 20 can rotate downward from the upright non-use or stowed position to the deployed or use position, as shown in FIG. 5C. Thus, in an automated rotating sequence of the unoccupied seat assembly 10, it is contemplated that the seat portion 20 thereof will pivot to the upright non-use position to provide the reduced size rotational footprint RF2. Further, the seatback 22 can rotate to a vertical position, as shown in FIGS. 2B and 5B, to reduce a rotational footprint of an upper portion of the seat assembly 10. The seat assembly 10 will then rotate or swivel on the swivel mechanism 30, as further described below from a forward-facing configuration to a rearward-facing configuration. The seat assembly 10, or the seat portion 20 alone, can then raise up using the appropriate lift mechanism 34, 34A to accommodate for raised floorboards in a rear portion of a vehicle. Further, the seat assembly 10 can slide in a car-forward direction along the track assembly 18 to accommodate legroom for the seat occupant and other passengers. All of these steps can be fully automated using the seat assembly 10 of the present concept, or can be provided in a manually powered manner.

Referring now to FIG. 5C, the seat occupant 26 is shown seated in the seat assembly 10 in a rearward-facing configuration. As seated in the seat assembly 10, the feet of the seat occupant 26 are positioned on the raised portion 6A of the floorboard 6. As such, the seat portion 20 has been raised to a raised position by the lift mechanism 34A to accommodate for the seat occupant's feet being supported on a raised portion 6A of the floorboard 6. With the seat portion 20 shown in the deployed or use position in FIG. 5C, the seat assembly 10 includes a radius R1 defined between the centrally disposed pivot axis PA and the front edge 28 of the seat portion 20 which is no longer vertically juxtaposed over the lift mechanism 34A, but rather extending forward from the lift mechanism 34A above the lift mechanism 34A.

Figure 6:
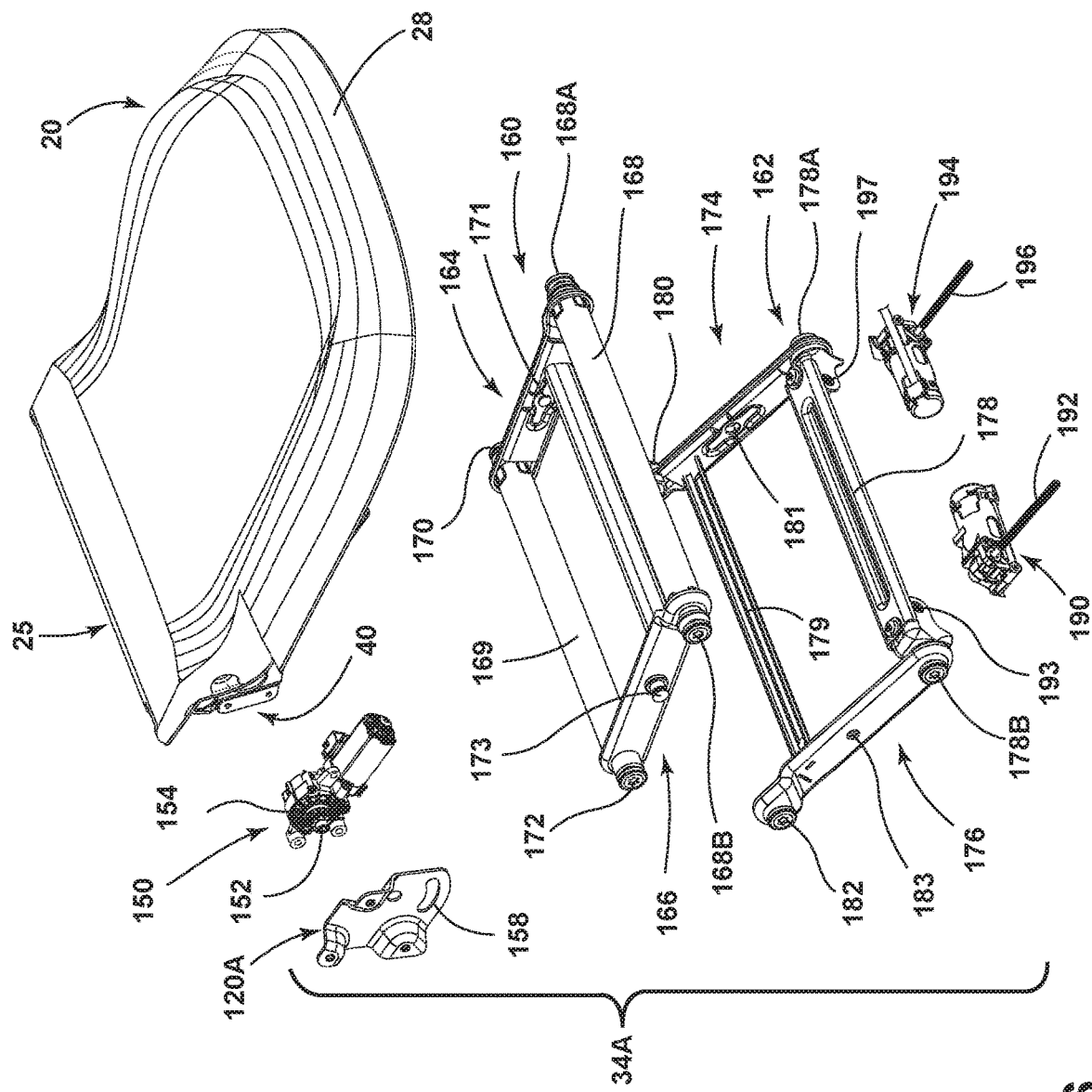
FIG. 6 is a an exploded top perspective view of the seat portion and lift mechanism of FIG. 5C.

Referring now to FIG. 6, the lift mechanism 34A is shown in an exploded view away from the seat portion 20. In an assembled condition, the lift mechanism 34A is operably coupled between the base frame 32 and the seat portion 20 for adjusting a vertical position of the seat portion 20 relative to the base frame 32, as shown in FIGS. 5A-5C. As specifically shown in FIG. 6, the lift mechanism 34A is shown as a scissor lift mechanism much like lift mechanism 34 shown in FIGS. 3A-3C and 4A-4D. The lift mechanism 34A includes a first lift member 160 and a second lift member 162. The first lift member 160 includes a first link 164 and a second link 166 spaced-apart from one another and interconnected at front portions thereof by a front cross member 168, and interconnected at rear portions thereof by a rear cross member 169. The first and second links 164, 166 of the first lift member 160 include rear pivot points 170, 172, respectively, for pivotally mounting the rear portions of the first and second links 164, 166 to the base frame 32 of the seat assembly 10, as shown in FIGS. 5A and 5C. The first and second links 164, 166 further include centrally disposed pivot points 171, 173, respectively, for pivotally coupling the first lift member 160 to the second lift member 162. The first lift member 160 further includes front pivot points 168A, 168B disposed on front portions of the first and second links 164, 166. The front pivot points 168A, 168B are configured to couple to slots 208A, 208B of support brackets 200, 202 that interconnect the seat portion 20 and the seatback 22, as best shown in FIGS. 7A and 7B. Specifically, the front pivot points 168A, 168B are slidingly coupled to the slots 208A, 208B of support brackets 200, 202 for fore and aft movement therealong as the lift mechanism 34A raises and lowers. The rear pivot points 170, 172 of the first lift member 160 pivotally couple to the base frame 32, as best shown in FIGS. 5A and 5C.

With reference to the second lift member 162 of FIG. 6, the second lift member 162 includes first and second links 174, 176 which are spaced-apart from one another and interconnected by a front cross member 178 at front portions of the first and second links 174, 176, and interconnected at rear portions thereof by a rear cross member 179. Like the first lift member 160, the first and second links 174, 176 of the second lift member 162 include rear pivot points 180, 182, respectively, which are used to pivotally couple the second lift member 162 to the support brackets 200, 202, as shown in FIGS. 7A and 7B. The first and second links 174, 176 of the second lift member 162 further include centrally disposed pivot points 181, 183 for pivotally coupling to the first and second links 164, 166 of the first lift member 160 at the centrally disposed pivot points 171, 173 thereof. In this way, a scissor lift mechanism is provided between the first and second lift members 160, 162. The second lift member 162 further includes front pivot points 178A, 178B disposed on front portions of the first and second links 174, 176. The front pivot points 178A, 178B are configured to slidingly couple to slots 188A, 188B, respectively, of the base frame 32 for fore and aft movement therealong, as best shown in FIGS. 5A and 5C.

Figure 7C:
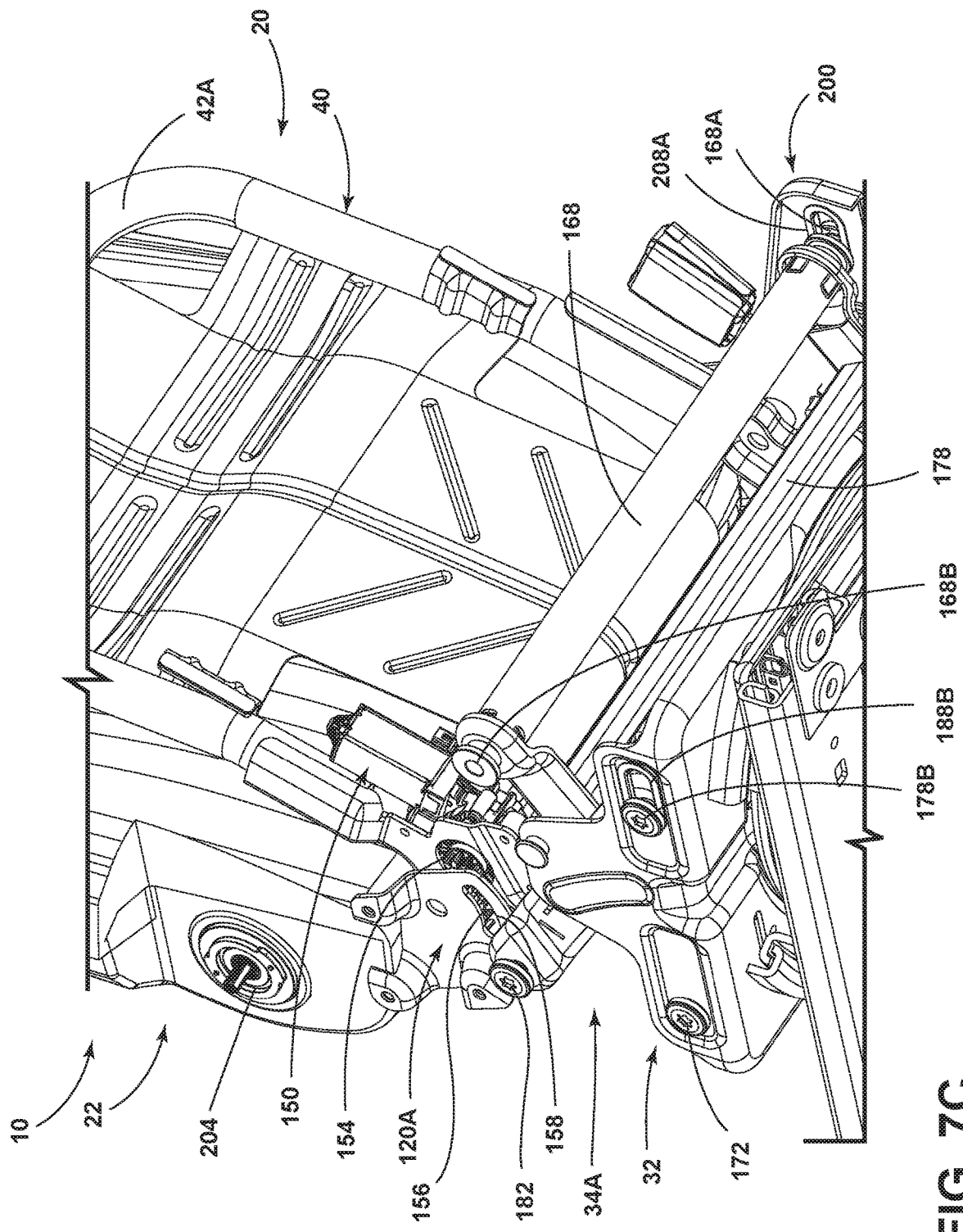
FIG. 7C is a bottom perspective view of the seat portion and lift mechanism of FIG. 7B with a support bracket removed therefrom.

With further reference to FIG. 6, the actuator 150 is shown exploded away from the seat portion 20. The actuator 150 is configured much like actuator 128, in that actuator 150 also includes a spur gear 154 situated on a drive shaft 152 for rotational movement. A bracket 120A is configured to fixedly couple to a support bracket 202 (FIGS. 7A, 7B). Bracket 120A is much like rearwardly extending bracket 120 of lift mechanism 34, in that bracket 120A includes also a sector portion 156 (FIG. 7C) and a guide slot 158 disposed therethrough. As such, both brackets 120, and 120A may be referred to herein as sector brackets. In use, the sector bracket 120A is configured to engage the spur gear 154 of actuator 150 (FIG. 7C) for driving the seat portion 20 between the deployed and upright non-use positions.

With further reference to FIG. 6, actuators 190, 194 are shown exploded away from the lift mechanism 34A. The actuators 190, 194 each include threaded drive shafts 192, 196, respectively, which are configured to engage threaded members 193, 197 disposed on the front cross member 178 of the second lift member 162. In use, the drive shafts 192, 196 of the actuators 190, 194 engage the threaded members 193, 197 to drive the lift mechanism 34A between raised and lowered positions. Engagement of the drive shafts 192, 196 of the actuators 190, 194 with the threaded members 193, 197 of the second lift member 162 is best shown in FIGS. 7A and 7B.

Referring now to FIGS. 7A and 7B, first and second support brackets 200, 202 are shown disposed on opposite sides of the seat portion 20. The first and second support brackets 200, 202 are configured to interconnect the seat portion 20 and seatback 22 (FIG. 5A) with the lift mechanism 34A. The support brackets 200, 202 include recliner mechanisms 204, 206, respectively, which are configured to couple the seatback 22 to the support brackets 200, 202 in a reclining manner. As further shown in FIG. 6, the actuators 190, 194 include mounting portions 191, 195, respectively, for mounting the actuators 190, 194 to the base frame 32. Thus, with the actuators 190, 194 fixedly mounted to the base frame 32, the driving movement of the engagement of the drive shafts 192, 196 with the threaded members 193, 197 provides for the sliding movement of front pivot points 168A, 168B, 178A, 178B of the lift mechanism 34A with the respective slots 208A, 208B and 188A, 188B of the support brackets 200, 202 and the base frame 32. In this way, this lift mechanism 34A can move in a scissor-like fashion between raised and lowered positions to move both the seat portion 20 and the seatback 22 of the seat assembly 10.

Referring now to FIG. 7C, the seat portion 20 is shown in the upright non-use position and the support bracket 202 has been removed to show an engagement of actuator 150 with sector bracket 120A. Specifically, spur gear 154 of actuator 150 is shown gearingly engaged with sector portion 156 of sector bracket 120A. As gearingly coupled thereto, the actuator 150 drives the movement of the seat portion 20 as the actuator 150 is coupled to the seat frame 40. This geared engagement is concealed in FIGS. 7A and 7B by the support bracket 202. It is further contemplated that the actuator 150 and the sector bracket 120 may be disposed on an opposite side of the seat portion 20, or, in another embodiment, the seat portion 20 may include two actuators to power the pivoting movement of the seat portion 20. In this way, the actuator 150 is operably coupled between the support bracket 202 via the sector bracket 120A and the seat portion 20 for driving movement of the seat portion 20 as coupled to the seat frame 40 thereof.

In order to accommodate various sized seat occupants and multi-level floor boards within a vehicle, the seat assembly 10 is configured to provide a range of vertical movement that can meet the needs of a seat occupant within various vehicle interiors. Specifically, the lift mechanisms 34, 34A described above may include an upper limit of travel between 60 millimeters and 100 millimeters for moving the seat portion 20, and the seat frame 40 thereof, between the raised and lowered positions. As such, it is contemplated that the seat portion 20 shown FIGS. 2A and 2B in the lowered position has been raised approximately 60 mm-100 mm to the raised position shown in FIG. 2C. Similarly, it is contemplated that the seat portion 20 shown in the lowered position in FIG. 5A has been raised approximately 60 mm-100 mm to the raised position shown in FIGS. 5B and 5C.

Figure 8:
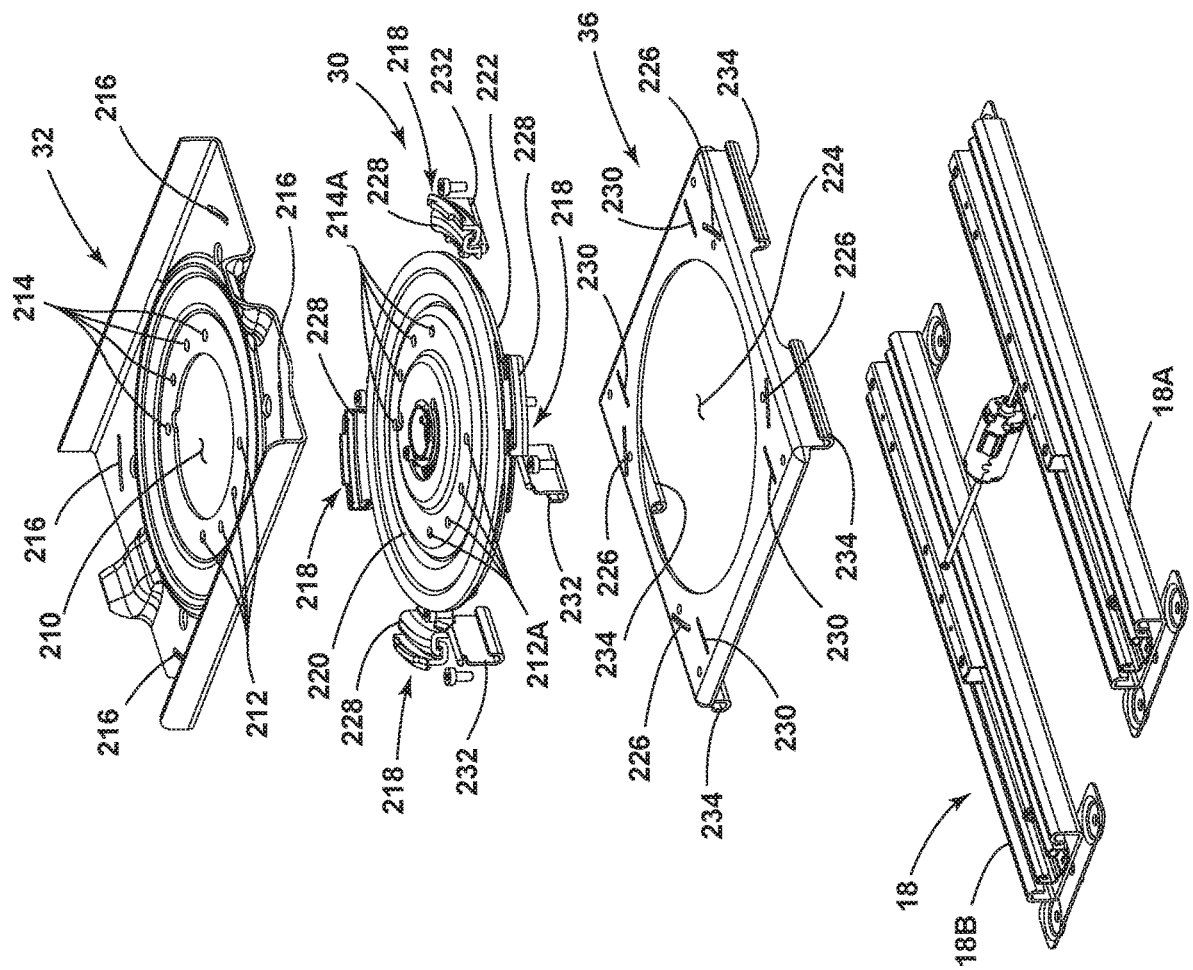
FIG. 8 is an exploded top perspective view of a swivel mechanism and track assembly.

Referring now to FIG. 8, an exploded view of the lower components of the seat assembly 10 is shown. Specifically, the exploded view of FIG. 8 includes a base frame 32, a swivel mechanism 30 and a track assembly 18 having first and second tracks 18A, 18B. As shown in FIG. 8, the base frame 32 includes a configuration similar to the base frame 32 described in FIGS. 2A-4C with the first and second sides 130, 132 (FIGS. 4B and 4C) removed therefrom. In the description of the interconnection between the base frame 32 and the swivel mechanism 30, it is contemplated that the base frame 32 shown in FIG. 8 exemplifies the base frame 32 as described throughout the present specification in all forms. The base frame 32 includes a centrally disposed aperture 210 having mounting apertures 212, 214 disposed therearound. The mounting apertures 212, 214 are configured to fixedly couple the base frame 32 to an upper portion 220 of the swivel mechanism 30 at mounting apertures 212A, 214A of the upper portion 220 of the swivel mechanism 30. The base frame 32 further includes a plurality of slots 216 disposed therearound for receiving hook members 218. The hook members 218 are configured to operably couple to engagement members 228 which are operably coupled to slots 226 of the mounting plate 36. Much like the base frame 32, the mounting plate 36 includes a plurality of slots 226 for coupling to the engagement members 228. The engagement members 228 are contemplated to be fixedly mounted to the mounting plate 36 at the slots 226. The hook members 218 are contemplated to be fixedly mounted the slots 216 of the base frame 32 for rotation of the base frame 32 as coupled to the upper portion 220 of the swivel mechanism 30. The swivel mechanism 30 further includes a base portion 222 which is mounted to the mounting plate 36 at a centrally disposed aperture 224 in which the swivel mechanism is received. As shown in FIG. 8, the mounting plate 36 further includes slots 230 for fixedly coupling to engagement members 232. The engagement members 232 are used in conjunction with hooked-shaped members 234 disposed on the mounting plate 36 to slidingly couple to the mounting plate 36 to the track assembly 18 for fore and aft movement thereon.

Thus, as noted above, the lift mechanisms 34, 34A of the present concept are configured to be fixedly mounted to the base frame 32 for vertical movement thereon. As such, the seat assembly 10 can move between vertical positions using the lift mechanisms 34, 34A. Further, the seat assemblies 10 can rotate or swivel between forward-facing and rearward-facing configurations, as the base frame 32 is rotatably mounted to the swivel mechanism 30. Specifically, the upper portion 220 of the swivel mechanism 30 is rotatably supported on the base portion 222 of the swivel mechanism 30. It is contemplated that the upper portion 220 and the base portion 222 of the swivel mechanism 30 are engaged by a ball bearing connection or other like connection to provide consistent swivel movement between forward-facing and rearward-facing configurations. As the base frame 32 rotates, the hook members 218 rotate therewith to engage the adjacent engagement members 228 as mounted to the mounting plate 36. Thus, the engagement between the hook members 218 and the engagement members 228 is not a fixed engagement, but a selective engagement based on the rotation of the seat assembly 10 and the base frame 32 thereof.

Figure 9:
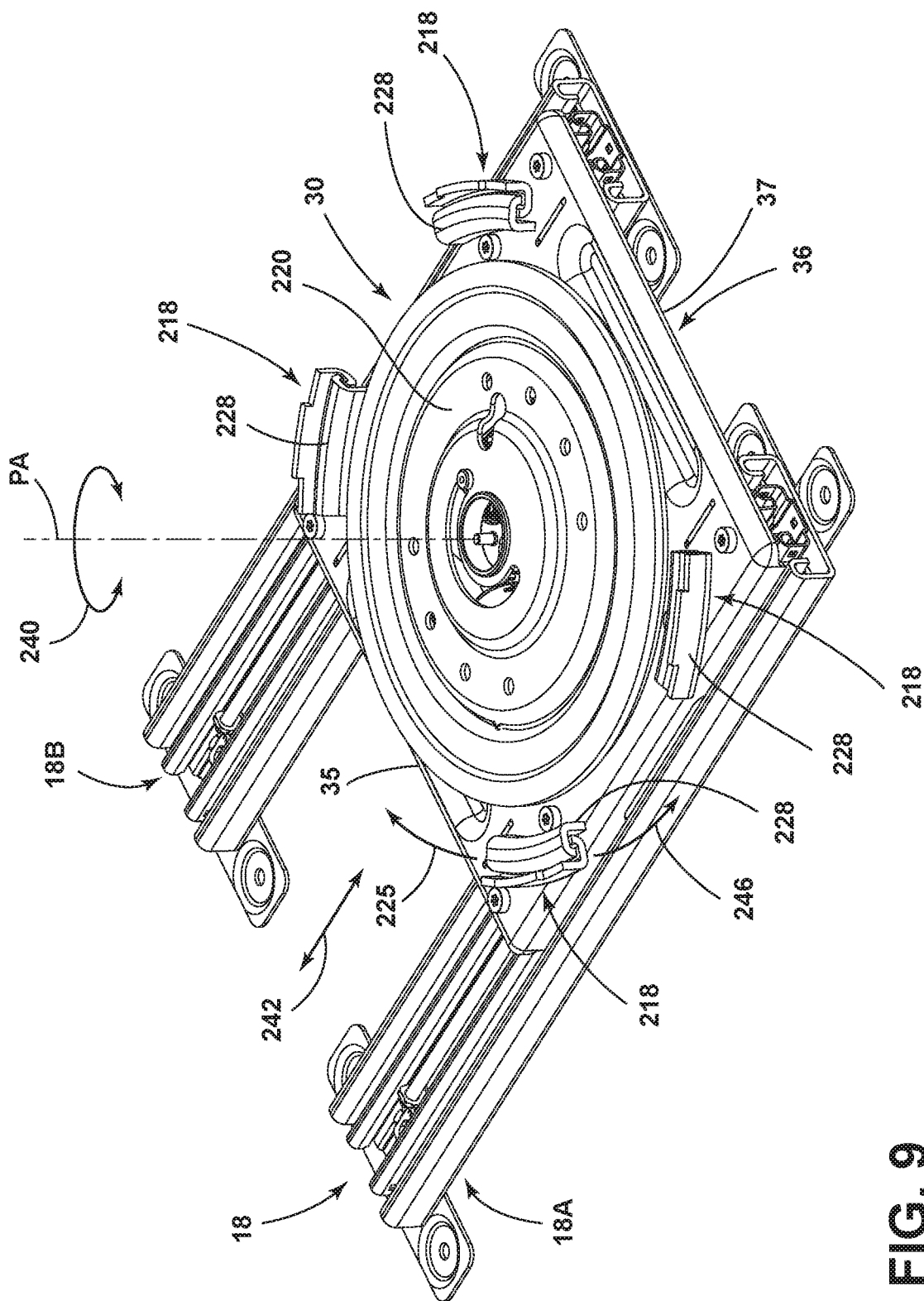
FIG. 9 is a top perspective view of the swivel mechanism of FIG. 8 shown in an assembled condition.

Referring now to FIG. 9, the swivel mechanism 30 is shown mounted on the mounting plate 36 wherein the upper portion 220 thereof is configured for rotation along a pivot axis PA as shown by arrow 240. As noted above, the pivot axis PA is a centralized pivot axis defined by the swivel mechanism 30 for rotation of the seat assembly 10 described above. In FIG. 9, the mounting plate 36 is shown as being slidably mounted on the track assembly 18 for fore and aft movement along the track assembly 18 in the direction as indicated by arrow 242. The hook members 218 and engagement members 228 are shown in an engaged condition, and are configured to engage one another to ensure that the seat assembly 10 is stable in both the forward-facing and rearward-facing configurations. In FIG. 9, the base frame 32 of FIG. 8 has been removed to reveal the engagement between the hook members 218 and the engagement members 228. As noted above however, the hook members 218 are contemplated to be mounted to the slots 216 of the base frame 32 for rotation therewith. As specifically shown in FIG. 9, hook member 218 shown supported along a front portion 35 of the mounting plate 36 can be rotated in the directions 225, 246 with the base frame 32 when the seat assembly 10 rotates between rearward and forward-facing configurations. Thus, if the base frame 32 is mounted on the swivel mechanism 30, the base frame 32 can rotate in the direction 225 to move the seat assembly 10 from a forward-facing configuration to a rearward-facing configuration. As the base frame 32 rotates along the path as indicated by arrow 225, the hook member 218 disposed near the front portion 35 of the mounting plate 36 in FIG. 9 will rotate towards the engagement member 228 disposed over second track 18B near the front portion 35 of the mounting plate 36. Ultimately, the hook member 218 will settle into a position where it is engaged with the engagement member 228 disposed over second track 18B near the rear portion 37 of the mounting plate 36 after a 180° seat rotation. Once engaged therewith, it is assumed that the seat assembly 10 is now in a rearward-facing configuration. As such, the hook members 218 are configured for selective engagement between adjacent engagement members 228 of the mounting plate 36.

Figure 10:
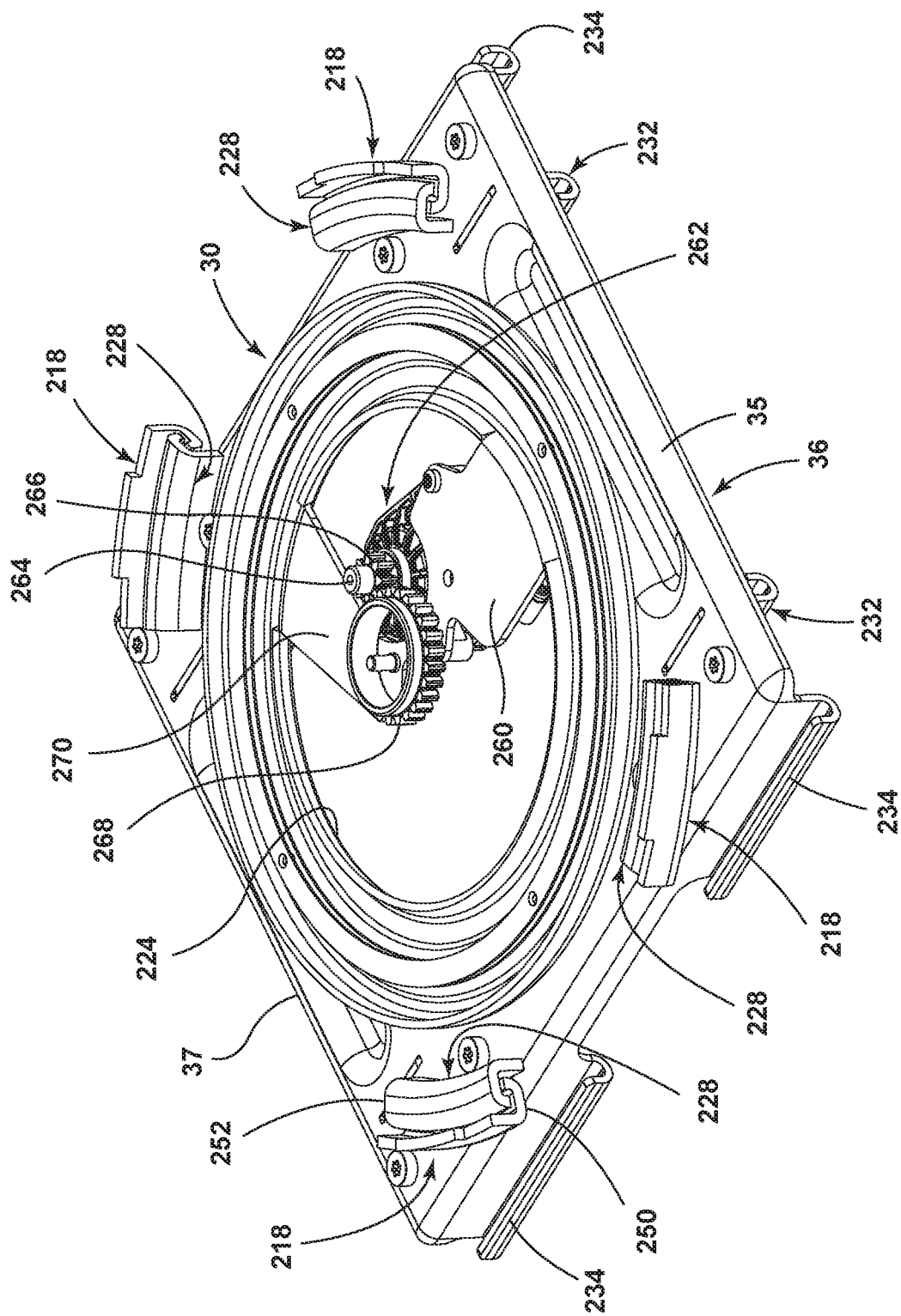
FIG. 10 is a top perspective view of the swivel mechanism of FIG. 9 with an upper portion of the swivel mechanism removed.

Referring now to FIG. 10, multiple hook members 218 are shown engaged with multiple engagement members 228. The hook members 218 are configured to downwardly extend from the base frame 32, as described above. The hook members 218 include upwardly turned end portions 250 to provide an overall J-shaped configuration. Similarly, the engagement members 228 of the mounting plate 36 upwardly extend from the mounting plate 36 and include downwardly opening channels 252. In use, the upwardly turned end portions 250 of the hook members 218 are configured to be received in the downwardly opening channels 252 of engagement members 228 in a selective manner as the base frame 32 rotates with the hook members 218. As such, the upwardly turned end portions 250 of the hook members 218 are contemplated to be slidably received within the downwardly opening channels 252 of the engagement members 228 to allow for rotation of the base frame 32 relative to the mounting plate 36. As further shown in FIG. 10, the hook members 218 and the engagement members 228 are curved to provide the necessary rotation of the mounting plate 36 without interference between the engagement of the hook members 218 and engagement members 228.

As further shown in FIG. 10, the upper portion 220 of the swivel mechanism 30 has been removed to reveal a mounting bracket 260 having an actuator 262 mounted thereon. The actuator 262 includes a drive shaft 264 rotatably supporting a spur gear 266 thereon. The spur gear 266 is gearingly engaged with a sector portion 268 of a bracket 270 which is contemplated to be engaged with the upper portion 220 of the swivel mechanism 30. In this way, the rotation of the spur gear 266 of the actuator 262 can drive rotation of the upper portion 220 of the swivel mechanism 30 by the engagement of the spur gear 266 with the bracket 270 and the sector portion 268 thereof. In this way, the actuator 262 is operably coupled between the base portion 222 and the upper portion 220 of the swivel mechanism 30 for rotating the seat portion 20 within the confines of the second rotational footprint RF2 described above. As shown in FIGS. 2A-2C and 5A-5C, the base frame 32 is configured to be operably coupled to the upper portion 220 of the swivel mechanism 30 for rotation along the centrally disposed pivot axis PA thereof. Thus, the swivel mechanism 30 is operably coupled to the base frame 32 for moving the seat assembly 10 between forward-facing and rearward-facing configurations.

As used throughout this disclosure, the term "actuator" is meant to describe a component of a system that is responsible for moving and controlling parts of the system. For example, by lifting the seat assembly, swiveling the seat assembly between forward-facing and rearward-facing configurations, or pivoting the seat portion between the stowed and deployed positions, an actuator is used to make these adjustments powered adjustments performed in unoccupied seat assemblies. In simple terms, the actuators described herein are "movers" that generally require a control signal and a source of energy, such as the power source of the vehicle.

According to one aspect of the present invention, a seat assembly includes a base frame. A lift mechanism is supported on the base frame. A seatback is operably coupled to a seat portion. The seatback and the seat portion are vertically adjustable as powered by the lift mechanism. The seat portion is pivotally coupled to the seatback by a support bracket for rotational movement between first and second positions. A seat frame of the seat portion is vertically juxtaposed over the lift mechanism when the seat portion is in the second position.

Embodiments of the first aspect of the invention can include any one or a combination of the following features:
  the seat portion includes front and rear portions, and further wherein the rear portion of the seat portion is pivotally coupled to the seatback;
  the front portion of the seat portion is disposed adjacent to an upper portion of the seatback when the seat portion is in the second position;
  the rear portion of the seat portion is disposed adjacent to a lower portion of the seatback when the seat portion is in both the first and second positions;
  the lift mechanism includes an upper limit of travel in a range from 60 mm to 100 mm when moving the seat frame between a lowered position and a raised position;
  a swivel mechanism having an upper portion, wherein the base frame is rotatably supported on the upper portion of the swivel mechanism for rotation about a pivot axis;
  a first actuator operably coupled to the swivel mechanism for powering rotation of the upper portion thereof; and
  a second actuator operably coupled between the support bracket and the seat portion for driving the seat portion between the first and second positions.

According to another aspect of the present invention, a seat assembly includes a base frame. A swivel mechanism rotatably supports the base frame between forward-facing and rearward-facing configurations. A lift mechanism is operably coupled to the base frame. A seatback and seat portion are supported on the lift mechanism for vertical adjustment therewith. An actuator is operably coupled to the seat portion for driving the seat portion between a horizontal use position and an upright non-use position.

Embodiments of the second aspect of the invention can include any one or a combination of the following features:
  the seat assembly includes a first rotational footprint when the seat portion is in the use position and a second rotational footprint when the seat portion is in the upright non-use position, and further wherein the first rotation footprint is greater than the second rotational footprint;
  the first rotational footprint includes a radius measured between a central pivot axis of the swivel mechanism and a front portion of the seat portion;
  the second rotational footprint includes a radius measured between the central pivot axis of the swivel mechanism and a perimeter edge of the base frame;
  the front portion of the seat portion is vertically juxtaposed over the base frame when the seat portion is in the upright non-use position; and
  the front portion of the seat portion extends outwardly past the perimeter edge of the base frame when the seat portion is in the horizontal use position.

According to yet another aspect of the present invention, a seat assembly includes a base frame. A scissor lift mechanism includes first and second sets of pivotally coupled links disposed on opposite sides thereof. The first and second sets of pivotally coupled links are operably coupled to the base frame at lower portions thereof. The first and second sets of pivotally coupled links are interconnected by front and rear cross members. A seat frame is operable between first and second positions. A front edge of the seat frame is vertically juxtaposed over the base frame when the seat frame is in the second position. A swivel mechanism is operably coupled to the base frame for moving the seat assembly between forward-facing and rearward-facing configurations.

Embodiments of the first aspect of the invention can include any one or a combination of the following features:
- an actuator operably coupled to the seat frame, wherein the seat frame is moved between the first and second positions as powered by the actuator;
- a mounting plate having a centrally disposed aperture, wherein the swivel mechanism is received in the centrally disposed aperture of the mounting plate;
- a plurality of engagement members fixedly coupled to and upwardly extending from the mounting plate, each engagement member of the plurality of engagement members having a downwardly opening channel;
- a plurality of hook members fixedly coupled to and downwardly extending from the base frame for rotation therewith; and
- each hook member of the plurality of hook members includes an upwardly turned end portion configured to be slidingly received in the downwardly opening channels of the plurality of engagement members of the mounting plate as the seat assembly swivels between forward-facing and rearward-facing configurations.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly, comprising:
a swivel mechanism;
a base frame coupled to the swivel mechanism;
a lift mechanism supported on the base frame, such that the base frame and the lift mechanism are rotatably supported on the swivel mechanism between forward-facing and rearward-facing configurations; and
a seatback operably coupled to a seat portion, wherein the seatback and the seat portion are directly supported on the lift mechanism and vertically adjustable as powered by the lift mechanism, and further wherein the seat portion is pivotally coupled to the seatback by a support bracket for rotational movement between first and second positions, wherein a seat frame of the seat portion is vertically juxtaposed over the lift mechanism when the seat portion is in the second position.

2. The seat assembly of claim 1, wherein the seat portion includes front and rear portions, and further wherein the rear portion of the seat portion is pivotally coupled to the seatback.

3. The seat assembly of claim 2, wherein the front portion of the seat portion is disposed adjacent to an upper portion of the seatback when the seat portion is in the second position.

4. The seat assembly of claim 3, wherein the rear portion of the seat portion is disposed adjacent to a lower portion of the seatback when the seat portion is in both the first and second positions.

5. The seat assembly of claim 1, wherein the lift mechanism includes an upper limit of travel in a range from 60 mm to 100 mm when moving the seat frame between a lowered position and a raised position.

6. The seat assembly of claim 1, wherein the
swivel mechanism includes an upper portion, and further wherein the base frame is rotatably supported on the upper portion of the swivel mechanism for rotation about a pivot axis.

7. The seat assembly of claim 6, including:
a first actuator operably coupled to the swivel mechanism for powering rotation of the upper portion thereof.

8. The seat assembly of claim 7, including:
a second actuator operably coupled between the support bracket and the seat portion for driving the seat portion between the first and second positions.

9. A seat assembly, comprising:
a base frame supported on a swivel mechanism;
the swivel mechanism rotatably supporting the base frame and a lift mechanism, the swivel mechanism configured for rotation of the base frame and the lift mechanism between forward-facing and rearward-facing configurations;
the lift mechanism operably coupled to the base frame;
a seatback and seat portion supported directly on the lift mechanism for vertical adjustment therewith; and
an actuator operably coupled to the seat portion for driving the seat portion between a horizontal use position and an upright non-use position.

10. The seat assembly of claim 9, wherein the seat assembly includes a first rotational footprint when the seat portion is in the use position and a second rotational footprint when the seat portion is in the upright non-use position, and further wherein the first rotation footprint is greater than the second rotational footprint.

11. The seat assembly of claim 10, wherein the first rotational footprint includes a radius measured between a central pivot axis of the swivel mechanism and a front portion of the seat portion.

12. The seat assembly of claim 11, wherein the second rotational footprint includes a radius measured between the central pivot axis of the swivel mechanism and a perimeter edge of the base frame.

13. The seat assembly of claim 12, wherein the front portion of the seat portion is vertically juxtaposed over the base frame when the seat portion is in the upright non-use position.

14. The seat assembly of claim 13, wherein the front portion of the seat portion extends outwardly past the perimeter edge of the base frame when the seat portion is in the horizontal use position.

* * * * *